United States Patent
Futami

(10) Patent No.: US 9,360,851 B2
(45) Date of Patent: Jun. 7, 2016

(54) MOTOR CONTROL APPARATUS OF LINEAR MOTOR, MOTOR CONTROL METHOD OF LINEAR MOTOR, AND CONTROL PROGRAM OF LINEAR MOTOR

(75) Inventor: Shigeru Futami, Tokyo (JP)

(73) Assignee: THK CO., LTD., Tokyo (JP)

( * ) Notice: Subject to any disclaimer, the term of this patent is extended or adjusted under 35 U.S.C. 154(b) by 369 days.

(21) Appl. No.: 13/993,005

(22) PCT Filed: Dec. 20, 2011

(86) PCT No.: PCT/JP2011/079476
§ 371 (c)(1),
(2), (4) Date: Jun. 10, 2013

(87) PCT Pub. No.: WO2012/090781
PCT Pub. Date: Jul. 5, 2012

(65) Prior Publication Data
US 2013/0282192 A1   Oct. 24, 2013

(30) Foreign Application Priority Data
Dec. 28, 2010   (JP) ................................. 2010-293273

(51) Int. Cl.
*G05B 19/02* (2006.01)
*H02P 25/06* (2006.01)
(Continued)

(52) U.S. Cl.
CPC ................ *G05B 19/02* (2013.01); *G05B 19/18* (2013.01); *H02P 23/0063* (2013.01); *H02P 23/0068* (2013.01); *H02P 25/06* (2013.01)

(58) Field of Classification Search
CPC ........... F15B 2211/526; F15B 2211/85; F15B 2211/851; F15B 2211/853; G05B 13/24; G05B 13/235; G05B 2219/33119; G05B 2219/43; G05B 2219/43018; G05B 2219/43036; G05B 2219/43037; G05B 2219/43041; G05B 2219/43043; G05B 2219/43084; G05B 19/02; G05B 19/18; H02P 23/36; H02P 23/63; H02P 23/68

USPC .......................................................... 318/560
See application file for complete search history.

(56) References Cited

U.S. PATENT DOCUMENTS 4,698,773 A * 10/1987 Jeppsson ....................... 700/160
4,924,165 A *  5/1990 Kohno ........................... 318/592
(Continued)

FOREIGN PATENT DOCUMENTS

| CN | 1429355 A   | 7/2003 |
| JP | 05-015959 A | 1/1993 |

(Continued)

OTHER PUBLICATIONS

Office Action dated Feb. 15, 2015, issued in corresponding Chinese Patent Application No. 2011800626895, with English translation (16 pages).

(Continued)

*Primary Examiner* — Kenneth M Lo
*Assistant Examiner* — Michael J Huntley
(74) *Attorney, Agent, or Firm* — Westerman, Hattori, Daniels & Adrian, LLP

(57) ABSTRACT

A motor control apparatus is provided, including: a command generation unit that generates an acceleration pattern time-sequentially indicating an acceleration command value to be used during movement of a target object to a target position using a motor, makes a change to the generated acceleration pattern to prolong a period of reducing a driving speed of the motor in accordance with response characteristics of the motor, and outputs a position command value from the changed acceleration pattern; and a control unit that drives the motor using a proportional control with respect to a position deviation between the position command value output from the command generation unit and the target position of the target object, and changes a proportional control gain in the proportional control to a value larger than a current value when the target object reaches the vicinity of the target position.

8 Claims, 14 Drawing Sheets

(51) Int. Cl.
*G05B 19/18* (2006.01)
*H02P 23/00* (2016.01)

(56) References Cited

U.S. PATENT DOCUMENTS

| | | | |
|---|---|---|---|
| 5,223,778 A * | 6/1993 | Svarovsky et al. | 318/610 |
| 5,248,921 A * | 9/1993 | Kato et al. | 318/560 |
| 5,475,291 A * | 12/1995 | Yoshida et al. | 318/568.22 |
| 5,497,063 A * | 3/1996 | Day et al. | 318/610 |
| 5,942,870 A * | 8/1999 | Koschorrek et al. | 318/610 |
| 6,112,846 A * | 9/2000 | Mukai et al. | 180/446 |
| 6,320,345 B1 * | 11/2001 | Yuan | G03F 7/70725 318/569 |
| 6,756,760 B2 * | 6/2004 | Tanaka et al. | 318/560 |
| 8,508,160 B2 * | 8/2013 | Shoda et al. | 318/400.02 |
| 2003/0097193 A1 * | 5/2003 | Makino et al. | 700/42 |
| 2009/0141061 A1 * | 6/2009 | Jacobson et al. | 347/16 |
| 2009/0284204 A1 * | 11/2009 | Colby et al. | 318/490 |
| 2009/0284208 A1 * | 11/2009 | Ikeda et al. | 318/621 |
| 2009/0315502 A1 * | 12/2009 | King et al. | 318/573 |
| 2012/0053705 A1 * | 3/2012 | Bensoussan | 700/37 |
| 2012/0081062 A1 * | 4/2012 | Iesaki | 318/596 |
| 2012/0109374 A1 * | 5/2012 | Lee et al. | 700/245 |
| 2013/0249214 A1 * | 9/2013 | Ichinose et al. | 290/44 |

FOREIGN PATENT DOCUMENTS

| | | |
|---|---|---|
| JP | 05-017028 A | 1/1993 |
| JP | 07-031172 A | 1/1995 |
| JP | 07-295650 A | 11/1995 |
| JP | 11-194829 A | 7/1999 |
| JP | 2000-122724 A | 4/2000 |
| JP | 2001-331208 A | 11/2001 |
| JP | 2006-079526 A | 3/2006 |

OTHER PUBLICATIONS

Japanese Office Action dated Aug. 19, 2014, issued in Japanese Patent Application No. 2010-293273, w/English translation (3 pages).

International Search Report for PCT/JP2011/079476, mailing date of Mar. 19, 2012; With English translation.

* cited by examiner

US 9,360,851 B2

MOTOR CONTROL APPARATUS OF LINEAR MOTOR, MOTOR CONTROL METHOD OF LINEAR MOTOR, AND CONTROL PROGRAM OF LINEAR MOTOR

TECHNICAL FIELD

The present invention relates to a motor control apparatus, a motor control method, and a control program.

Priority is claimed on Japanese Patent Application No. 2010-293273, filed Dec. 28, 2010, the content of which is incorporated herein by reference.

BACKGROUND ART

In a positioning control of moving a target object to a target position using a motor for power, at a point of time at which output of a position command value is terminated, the target object has not reached the target position yet, and a position deviation occurs. Therefore, a time proportional to the reciprocal of a proportional control gain Kp with respect to the position deviation is necessary before the target object moves to the target position and the position deviation settles to "0".

A method of shortening a time (settling time) necessary for a positioning control by making a value of the proportional control gain Kp large is disclosed. However, when the proportional control gain Kp is set to a large value, a positional response becomes vibratory, and thus the settling time is lengthened inversely.

Accordingly, a technology of shortening the settling time while preventing the response from being vibratory by switching the value of the proportional control gain at a point of time at which the output of the position command value is terminated is suggested (PTL 1).

CITATION LIST

Patent Literature

[PTL 1] Japanese Unexamined Patent Application, First Publication No. H11 195829H11-194829

SUMMARY OF INVENTION

Technical Problem

In the above-described technology, when the output of the position command value is terminated, the value of the proportional control gain is switched. Therefore, it is necessary to set a value of a proportional control gain after the switching on the basis of a position deviation when the output of the position command value is terminated. In a case where the position deviation when the output of the position command value is terminated is large, it is impossible to set a large value with respect to the proportional control gain after the switching. Therefore, there is room for improvement of the shortening of the settling time.

An object of the invention is to provide a motor control apparatus capable of shortening a settling time by reducing a position deviation during switching of a position control gain, a motor control method, and a control program.

Solution to Problem

According to an embodiment of the invention, a motor control apparatus is provided, including: a command generation unit that generates an acceleration pattern time-sequentially indicating an acceleration command value to be used during movement of a target object to a target position using a motor, makes a change to the generated acceleration pattern to prolong a period of reducing a driving speed of the motor in accordance with response characteristics of the motor, and outputs a position command value from the changed acceleration pattern; and a control unit that drives the motor using a proportional control with respect to a position deviation between the position command value output from the command generation unit and the target position of the target object, and changes a proportional control gain in the proportional control to a value larger than a current value when the target object reaches the vicinity of the target position.

According to another embodiment of the invention, a motor control method is provided, including: a command generation step of generating an acceleration pattern time-sequentially indicating an acceleration command value to be used during movement of a target object to a target position using a motor, making a change to the generated acceleration pattern to prolong a period of reducing a driving speed of the motor in accordance with response characteristics of the motor, and outputting a position command value from the changed acceleration pattern; and a control step of driving the motor using a proportional control with respect to a position deviation between the position command value output from the command generation unit and the target position of the target object, and changing a proportional control gain in the proportional control to a value larger than a current value when the target object reaches the vicinity of the target position.

According to still another embodiment of the invention, a motor control program is provided allowing a computer to execute: a command generation step of generating an acceleration pattern time-sequentially indicating an acceleration command value to be used during movement of a target object to a target position using a motor, making a change to the generated acceleration pattern to prolong a period of reducing a driving speed of the motor in accordance with response characteristics of the motor, and outputting a position command value from the changed acceleration pattern; and a control step of driving the motor using a proportional control with respect to a position deviation between the position command value output from the command generation unit and the target position of the target object, and changing a proportional control gain in the proportional control to a value larger than a current value when the target object reaches the vicinity of the target position.

Advantageous Effects of Invention

According to the invention, it is possible to shorten a settling time by changing a value of a proportional control gain at an appropriate timing.

DESCRIPTION OF EMBODIMENTS

A motor control apparatus, a motor control method, and a control program according to embodiments of the invention will be described with reference to the attached drawings.

First Embodiment

Figure 1:
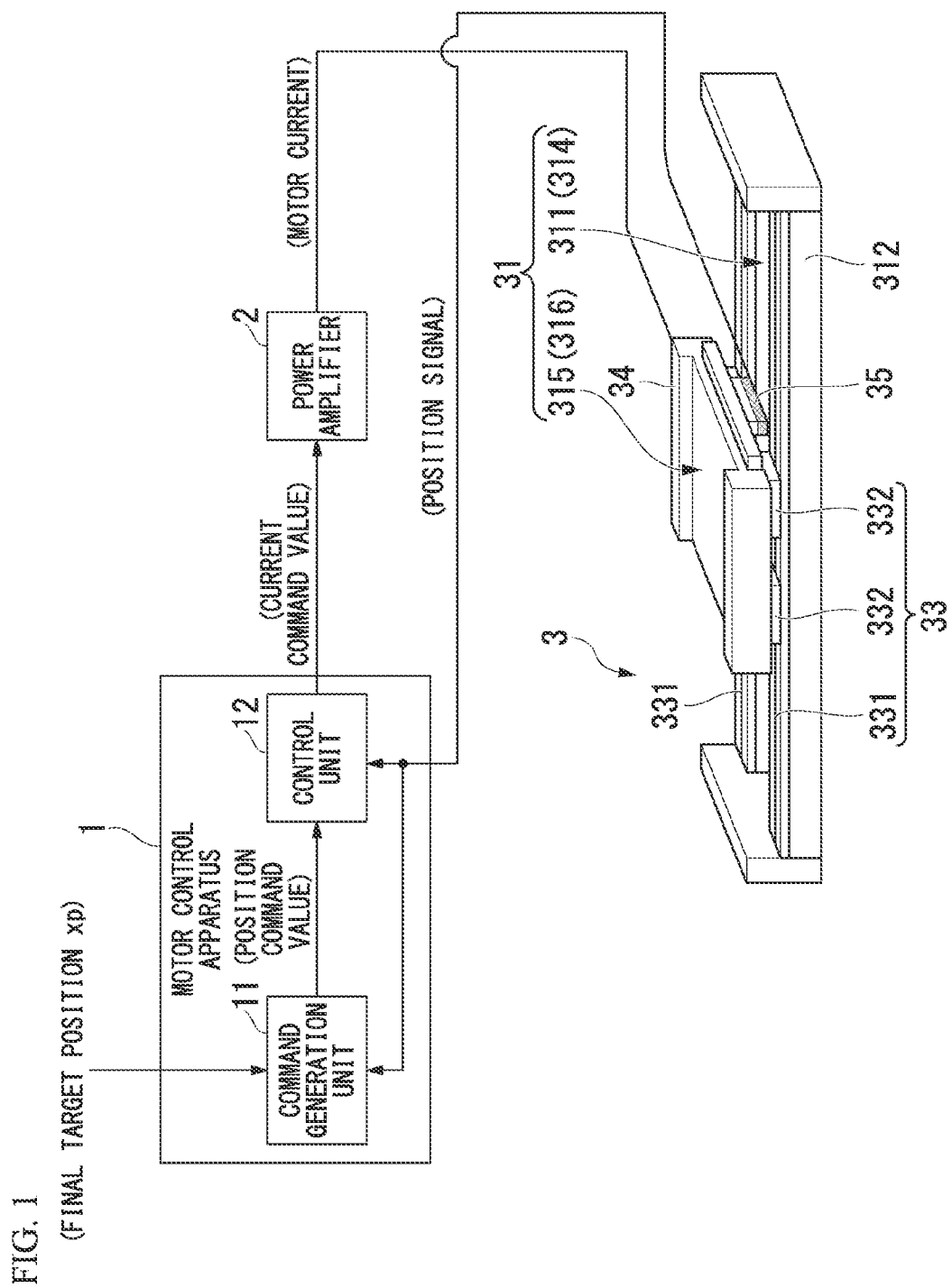
FIG. 1 is a schematic block diagram illustrating a configuration of a motor control apparatus 1 according to a first embodiment of the invention.

FIG. 1 is a schematic block diagram illustrating a configuration of the motor control apparatus 1 according to the first embodiment of the invention.

The motor control apparatus 1 drives a linear motor 31 by allowing a current to flow to a linear motor 31 provided to a conveying apparatus 3 through a power amplifier 2.

The conveying apparatus 3 is provided with a linear motor 31 including a long stator 311 and a movable member 315 that moves on the stator 311, and a pair of guide devices 33 and 33 that connect the stator 311 and the movable member 315 to each other.

Each of the guide devices 33 includes a trajectory rail 331 and a slide block 332 that are connected to each other through a ball. The trajectory rail 331 of the guide device 33 is fixed to a base 312 provided to the stator 311.

The slide block 332 of the guide device 33 is fixed to the movable member 315. The movable member 315 is freely guided on the stator 311 along the trajectory rail 331.

The stator 311 is provided with a plurality of drive magnets 314 provided between a pair of trajectory rails 331 and 331. The plurality of drive magnets 314 are arranged in such a manner that magnetic poles of the N-pole and the S-pole are alternately disposed in a direction in which the movable member 315 moves. Hereinafter, a direction in which the movable member 315 moves is referred to as a movement direction.

The respective drive magnets 314 have the same length in the movement direction. The respective drive magnets 314 may obtain constant thrust regardless of a position of the movable member 315.

The movable member 315 includes an armature 316 having a plurality of coils, a movable table 34 on which an object to be conveyed is mounted, and a position detector 35. The position detector 35 detects a position of the movable table 34 using an optical-type or magnetic type linear scale, or the like.

Figure 2:
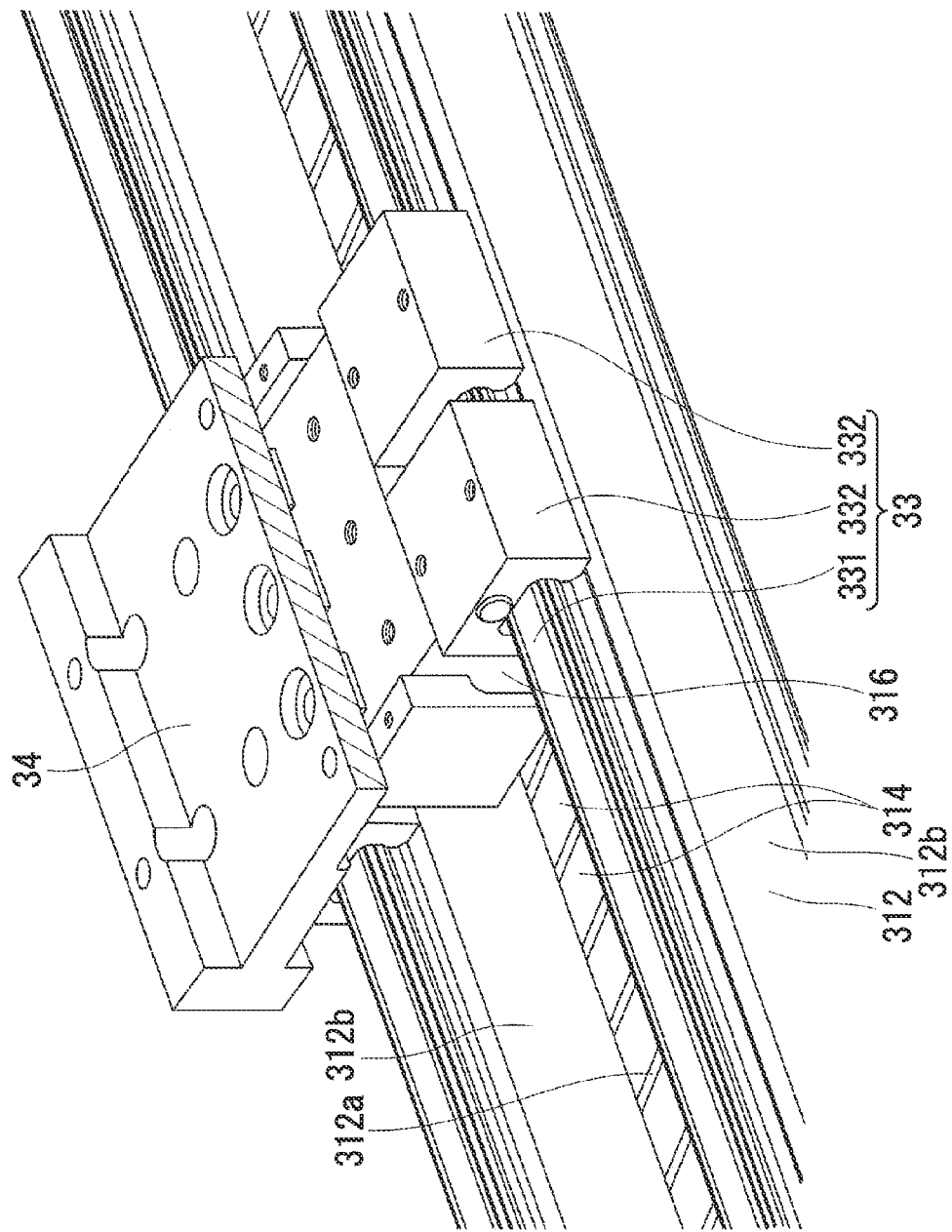
FIG. 2 is a perspective diagram (including a cross-section of a movable table 34) of a linear motor 31 according to the first embodiment of the invention.

FIG. 2 shows a perspective diagram (including a cross-section of the movable table 34) of a linear motor 31 according to the first embodiment of the invention.

The linear motor 31 is a flat type linear motor in which the movable member 315 linearly moves relatively to the stator 311.

The stator 311 is provided with the plurality of plate-shaped drive magnets 314. The drive magnets 314 are arranged in such a manner that a surface magnetized with an N-pole or S-pole faces the movable member 315.

The armature 316 provided to the movable member 315 is opposite to the drive magnets 314 with a constant gap present therebetween.

The stator 311 includes an elongated extending base 312. The plurality of drive magnets 314 are disposed in a line on the top surface of the base 312 in the movement direction. The base 312 includes a lower wall portion 312a and a pair of side wall portions 312b provided at both sides of the lower wall portion 312a in a width direction.

The plurality of drive magnets 314 are mounted on the lower wall portion 312a. In the respective drive magnets 314, magnetic poles of an N-pole or S-pole are formed on a surface opposite to the armature 316 provided to the movable member 315. In the respective drive magnets 314, a magnetic pole different from that of each adjacent drive magnet 314 faces the armature 316.

The trajectory rail 331 of the guide device 33 is mounted on the top surface of each of the side wall portions 312b of the base 312. The slide block 332 may be assembled to the trajectory rail 331 in a slidable manner. A plurality of balls (not shown) are disposed between the trajectory rail 331 and the slide block 332, and are allowed to roll.

A track-shaped ball circulation route is provided to the slide block 332, and thus the plurality of balls may be circulated.

When the slide block 332 slides against the trajectory rail 331, the plurality of balls roll between the trajectory rail 331 and the slide block 332, and circulate along the ball circulation route. According to this, the slide block 332 linearly moves in a smooth manner.

The movable table 34 of the movable member 315 is mounted on the top surface of the slide block 332 of the guide device 33. The movable table 34 is formed from a nonmagnetic material such as aluminum. An object to be conveyed may be placed on the top surface of the movable table 34. The armature 316 is hung on the bottom surface of the movable table 34.

Description will be continued returning to FIG. 1.

The motor control apparatus 1 is provided with a command generation unit 11 and a control unit 12. The command generation unit 11 generates a position command value from a final target position xp input from the upper-level control apparatus (not shown). The control unit 12 generates a current command value indicating a current value that is allowed to flow to the linear motor 31 on the basis of the position command value generated by the command generation unit 11 and a position signal indicating the position of the movable table 34.

The motor control apparatus 1 moves the movable table 34 to the final target position xp. The command generation unit 11 generates a position command value at the time of moving the movable table 34 to the final target position xp. The control unit 12 drives the linear motor 31 on the basis of the position command value.

Figure 3:
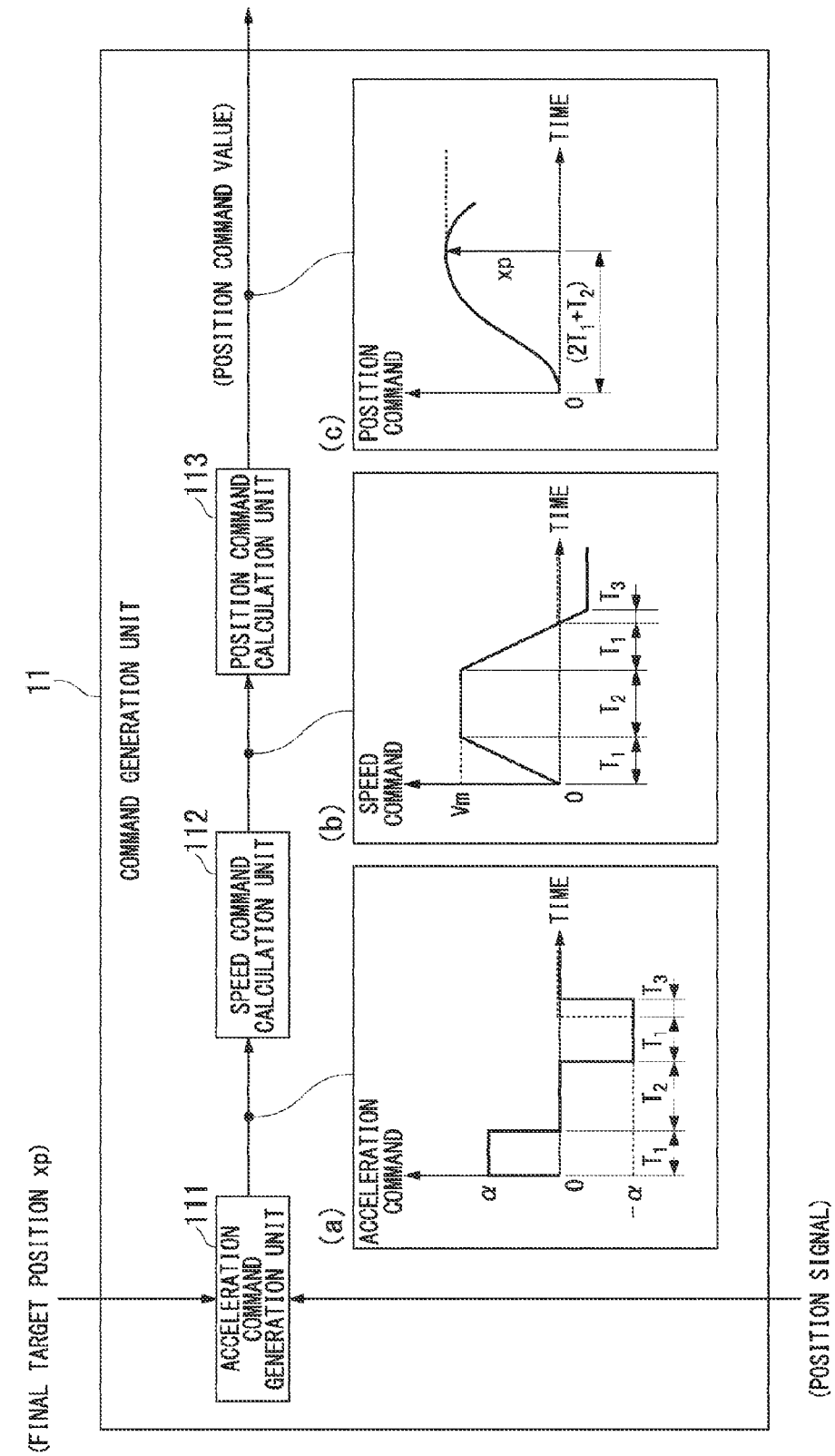
FIG. 3 is a schematic block diagram illustrating a configuration of a command generation unit 11 according to the first embodiment of the invention, and a graph illustrating an outline of a command that is calculated in the command generation unit 11.

FIG. 3 shows a schematic block diagram illustrating a configuration of the command generation unit 11 according to the first embodiment of the invention, and a graph illustrating an outline of a command that is calculated in the command generation unit 11. (a) shows a graph illustrating an acceleration command. (b) shows a graph illustrating a speed command. (c) shows a graph illustrating a position command.

The command generation unit 11 includes an acceleration command generation unit 111, a speed command calculation unit 112, and a position command calculation unit 113.

The acceleration command generation unit 111 calculates a distance for moving the movable table 34 from the final target position xp and the position of the movable table 34 that are input. The acceleration command generation unit 111 generates an acceleration pattern time-sequentially indicating an acceleration command value using the calculated distance, a thrust constant, and the like of the linear motor 31.

The acceleration command generation unit 111 makes a change to the generated acceleration pattern to prolong a period of decelerating the movable table 34. The acceleration command generation unit 111 time-sequentially outputs the acceleration command value on the basis of the changed acceleration pattern.

The acceleration pattern generated by the acceleration command generation unit 111 is constituted by an acceleration period (T1) of "acceleration=α", a constant speed period (T2) of "acceleration=0", and a deceleration period (T1) of "acceleration=−α".

As shown in the graph (a) illustrating the acceleration command in FIG. 3, the acceleration command generation unit 111 changes the acceleration pattern. The acceleration command generation unit 11 prolongs a deceleration period (T1) of "acceleration=−α" by a time T3, and sets the deceleration period to "T1+T3". The acceleration at the prolonged time T3 is set to the same acceleration as the deceleration period.

As the time T3, a value set in advance is used on the basis of a response delay of the linear motor 31. The time T3 is set to the same time as the response delay, or a time calculated from the reciprocal of a proportional control gain (proportional control gain Kp1) in the position control.

In this manner, the acceleration command generation unit 111 makes a change to the acceleration pattern to retard a timing to return the acceleration to "0" by a time T3.

The speed command calculation unit 112 calculates a speed command value of "highest speed=Vm" from the acceleration command value output from the acceleration command generation unit 111 using an integration operation. The acceleration command generation unit 111 time-sequentially outputs the calculated speed command value.

As shown in the graph (b) illustrating the speed command in FIG. 3, the speed command value calculated by the speed command calculation unit 112 is different from a speed command value of a general trapezoidal control. Since the acceleration command generation unit 111 prolongs a deceleration period by the time T3, the speed command value calculated by the speed command calculation unit 112 has a region in which the speed becomes a negative value.

The position command calculation unit 113 calculates a position command value from the speed command value calculated by the speed command calculation unit 112 using an integration operation. The position command calculation unit 113 time-sequentially outputs the calculated position command value to the control unit 12.

As shown in the graph (c) illustrating the position command in FIG. 3, the position command calculated by the position command calculation unit 113 is different from a general S-shaped curve. Since the acceleration command generation unit 111 prolongs the deceleration period, the position command calculated by the position command calculation unit 113 becomes a curve which swells upward and in which the final target position xp is set to a position at a time (2T1+T2).

According to the above-described configuration, when the acceleration command generation unit 111 retards the timing to return the acceleration to "0" by the time T3, the command generation unit 11 prolongs the period of outputting the position command value by the time T3.

Figure 4:
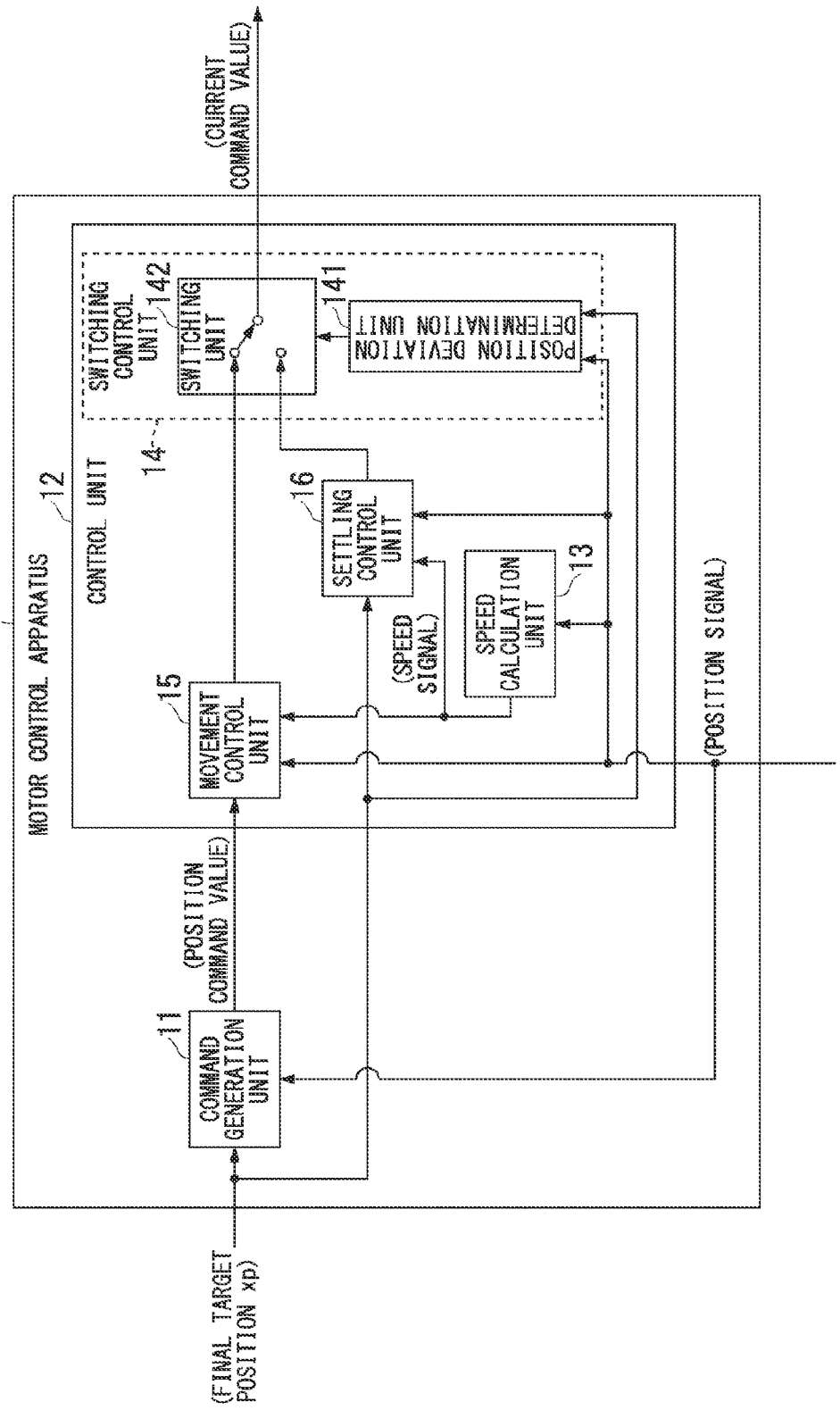
FIG. 4 is a schematic block diagram illustrating a configuration of a control unit 12 according to the first embodiment of the invention.

FIG. 4 shows a schematic block diagram illustrating a configuration of the control unit 12 according to the first embodiment of the invention.

The control unit 12 includes a speed calculation unit 13, a switching control unit 14, a movement control unit 15, and a settling control unit 16.

A position signal from the position detector 35 of the conveying apparatus 3 is input to the speed calculation unit 13. The speed calculation unit 13 calculates the movement speed of the movable table 34 from a variation amount per unit time of the input position signal. The speed calculation unit 13 outputs a speed signal indicating the calculated movement speed.

The switching control unit 14 includes a position deviation determination unit 141 and a switching unit 142.

The position deviation determination unit 141 obtains a deviation between the position x of the movable table 34 which is detected by the position detector 35, and the final target position xp. Hereinafter, the position x of the movable table 34, which is detected by the position detector 35, is referred to as a detection position x.

The position deviation determination unit 141 determines whether or not the obtained deviation is less than a threshold value Δx set in advance. The position deviation determination unit 141 controls the switching unit 142 according to a determination result.

The position deviation determination unit 141 determines whether or not the detection position x corresponds to a position, which satisfies the following conditional expression, in the vicinity of the final target position xp.

$$|xp-x|<\Delta x$$

The threshold value Δx is a value set in advance on the basis of resolution of the position detector 35, a positioning settling time that is required, or the like. The threshold value Δx is set on the basis of simulation or a measured value.

The switching unit 142 selects either the current command value output from the movement control unit 15 or the current command value output from the settling control unit 16 on the basis of the control of the position deviation determination unit 141. The switching unit 142 outputs the current command value that is selected to the power amplifier 2.

In a case where the deviation is equal to or more than the threshold value Δx, the position deviation determination unit 141 allows the current command value output from the movement control unit 15 to be selected by the switching unit 142. In a case where the deviation is less than the threshold value Δx, the position deviation determination unit 141 allows the current command value output from the settling control unit 16 to be selected by the switching unit 142.

The movement control unit 15 outputs the current command value on the basis of the position command value output from the command generation unit 11, the movement signal output from the speed calculation unit 13, and the position signal output from the position detector 35.

The settling control unit 16 calculates the current command value on the basis of the final target position xp, the movement signal output from the speed calculation unit 13, and the position signal output from the position detector 35, and outputs the calculated current command value.

Hereinafter, a detailed configuration of the movement control unit 15 and the settling control unit 16 will be described.

Figure 5:
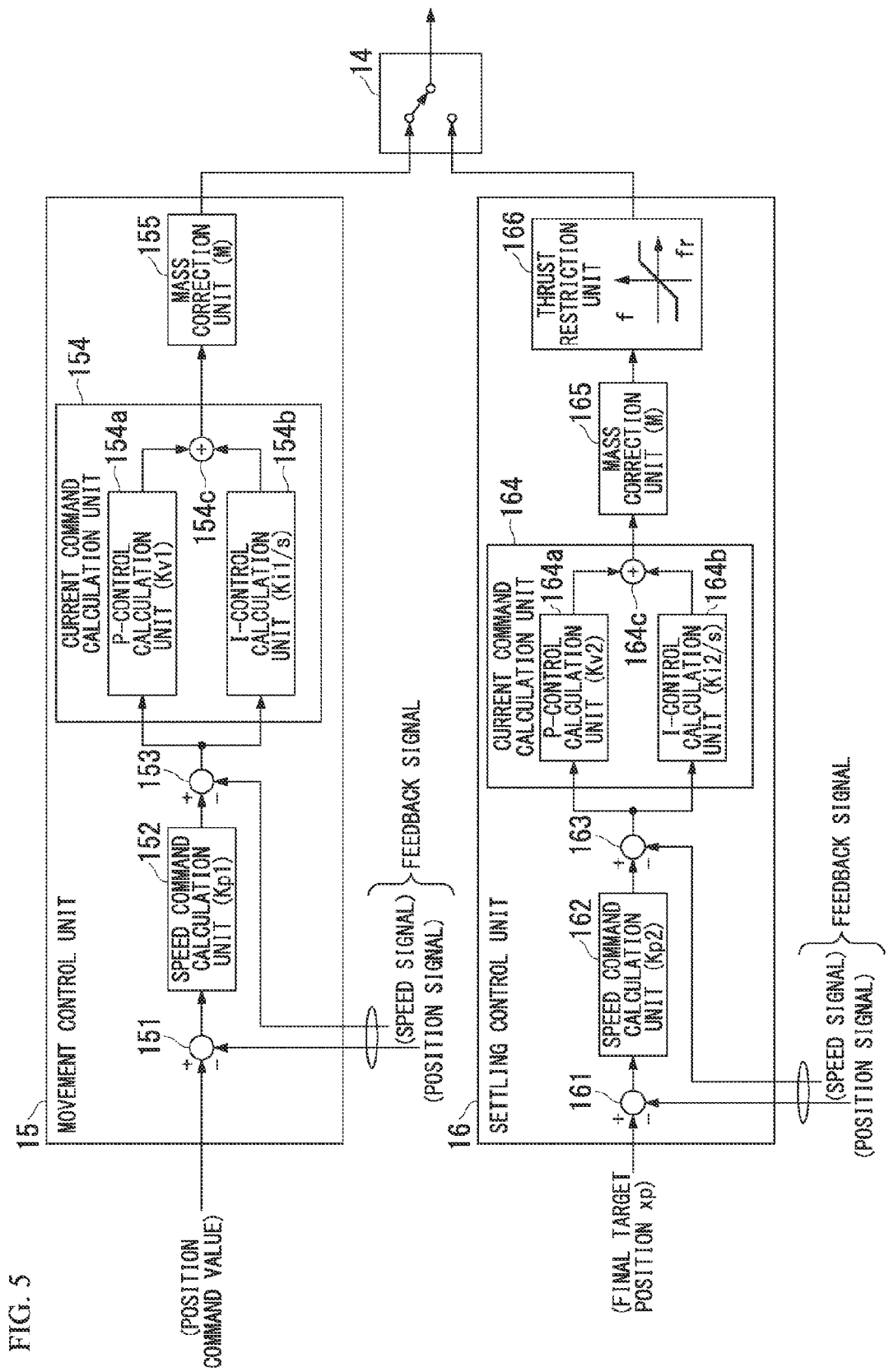
FIG. 5 is a schematic block diagram illustrating a configuration of a movement control unit 15 and a settling control unit 16 according to the first embodiment of the invention.

FIG. 5 shows a schematic block diagram illustrating the configuration of the movement control unit 15 and the settling control unit 16 according to the first embodiment of the invention.

The movement control unit 15 includes a position deviation calculation unit 151, a speed command calculation unit 152, a speed deviation calculation unit 153, a current command calculation unit 154, and a mass correction unit 155.

The position deviation calculation unit 151 calculates a position deviation between the position indicated by the position command value and the position of the movable table 34 from the position command value and the position signal, and outputs the calculated position deviation.

The speed command calculation unit 152 multiplies the position deviation calculated by the position deviation calculation unit 151 by a proportional control gain Kp1 (first proportional control gain) to calculate a speed command value, and outputs the calculated speed command value.

The speed deviation calculation unit 153 calculates a speed deviation between the speed command value calculated by the speed command calculation unit 152 and the movement speed of the movable table 34 which is indicated by the speed signal.

The current command calculation unit 154 includes a P-control calculation unit 154a, an I-control calculation unit 154b, and an adder 154c.

The P-control calculation unit 154a calculates a current command value by proportional operation using the speed deviation calculated by the speed deviation calculation unit 153 and a proportional control gain Kv1, and outputs the calculated current command value.

The I-control calculation unit 154b calculates a current command value by integration operation using the speed deviation calculated by the speed deviation calculation unit 153 and an integral control gain Ki1, and outputs the calculated current command value.

The adder 154c adds the current command values calculated by the P-control calculation unit 154a and the I-control calculation unit 154b. The adder 154c outputs the summed current command value to a mass correction unit 155.

In this manner, the current command calculation unit 154 calculates a current command value from the speed deviation by the PI-control operation using the proportional control gain Kv1 and the integral control gain Ki1. The current command calculation unit 154 outputs the calculated current command value to the mass correction unit 155.

The mass correction unit 155 corrects the current command value output from the current command calculation unit 154 on the basis of the mass of the movable table 34, or the mass of the movable table 34 and the mass of baggage and the like loaded on the movable table 34. The mass correction unit 155 outputs the corrected current command value to the switching control unit 14.

The settling control unit 16 includes a position deviation calculation unit 161, a speed command calculation unit 162, a speed deviation calculation unit 163, a current command calculation unit 164, a mass correction unit 165, and a thrust restriction unit 166.

The position deviation calculation unit 161 calculates a position deviation of the position of the movable table 34 with respect to the final target position xp from the final target position xp and the position signal, and outputs the calculated position deviation.

The speed command calculation unit 162 multiplies the position deviation calculated by the position deviation calculation unit 161 by a proportional control gain Kp2 (second proportional control gain) to calculate a speed command value, and outputs the calculated speed command value.

The speed deviation calculation unit 163 calculates a speed deviation between the speed command value calculated by the speed command calculation unit 162 and the movement speed of the movable table 34 which is indicated by the speed signal.

The current command calculation unit 164 includes a P-control calculation unit 164a, an I-control calculation unit 164b, and an adder 164c.

The P-control calculation unit 164a calculates a current command value by proportional operation using the speed deviation calculated by the speed deviation calculation unit 163 and a proportional control gain Kv2, and outputs the calculated current command value.

The I-control calculation unit 164b calculates a current command value by integration operation using the speed deviation calculated by the speed deviation calculation unit 163 and an integral control gain Ki2, and outputs the calculated current command value.

The adder 164c adds the current command values calculated by the P-control calculation unit 164a and the I-control calculation unit 164b. The adder 164c outputs the summed current command value to the mass correction unit 165.

In this manner, the current command calculation unit 164 calculates the current command value from the speed deviation using the PI-control operation using the proportional control gain Kv2 and the integral control gain Ki2. The current command calculation unit 164 outputs the calculated current command value to the mass correction unit 155.

The mass correction unit 165 corrects the current command value output from the current command calculation unit 164 on the basis of the mass of the movable table 34, or the mass of the movable table 34 and the mass of baggage and the like loaded on the movable table 34, and outputs the corrected current command value.

The thrust restriction unit 166 determines whether or not the current command value corrected by the mass correction unit 165 exceeds the maximum current value corresponding to the maximum thrust of the linear motor 31. In a case where it is determined that the current command value exceeds the maximum current value, the thrust restriction unit 166 restricts the current command value to the maximum current value, and outputs the restricted current command value to the switching control unit 14.

The proportional control gain Kp2 used in the settling control unit 16 is set in advance to a value larger than the proportional control gain Kp1 used in the movement control unit 15.

The proportional control gain Kv2 used in the settling control unit 16 is set in advance to a value equal to or larger than the proportional control gain Kv1 used in the movement control unit 15.

The integral control gain Ki2 is set in advance to a value equal to or larger than the integral control gain Ki1 used in the movement control unit 15.

According to the above-described configuration, when the final target position xp is input from the upper-level control apparatus, the motor control apparatus 1 allows the switching control unit 14 to select the movement control unit 15. The motor control apparatus 1 outputs the current command value calculated by the movement control unit 15 to the power amplifier 2 to drive the linear motor 31.

When the position of the movable table 34 reaches the vicinity of the final target position xp, the motor control apparatus 1 allows the switching control unit 14 to select the settling control unit 16.

The settling control unit 16 outputs the current command calculated using the proportional control gain Kp2 to the power amplifier 2, and settles the position of the movable table 34 to the final target position xp. The proportional control gain Kp2 becomes a value larger than the proportional control gain Kp1 used in the movement control unit 15.

Similarly to the switching from the proportional control gain Kp1 to the proportional control gain Kp2, switching from the proportional control gain Kv1 and the integral control gain Ki1 to the proportional control gain Kv2 and the integral control gain Ki2 is carried out.

In this manner, when the movable table 34 reaches the vicinity of the final target position xp, the motor control apparatus 1 switches the control gain to a larger value. According to this, the positioning settling time is shortened.

The values of the proportional control gains Kp1, Kv1, Kp2, and Kv2, and the values of the integral control gains Ki1 and Ki2 are determined on the basis of simulation results, or a measurement obtained using a real machine, and the like.

With regard to characteristics of friction occurring in the guide device 33 of the conveying apparatus 3, in a case where the movement distance is a distance equal to or larger than a magnitude of an extent expressed by a unit of 1 [mm] (rough movement control), Coulomb's friction characteristics are provided. In a case where the movement distance is a distance equal to or less than a magnitude of an extent expressed by a unit of 100 [μm] (slight movement control), non-linear spring characteristics are provided.

In a region in which the friction characteristics show the non-linear spring characteristics, a response is very slow compared to the Coulomb's friction characteristics.

When the position of the movable table 34 is located in the vicinity of the final target position xp, the switching control unit 14 switches the drive control of the linear motor 31 which uses the movement control unit 15 to the drive control of the linear motor 31 which uses the settling control unit 16. When the position of the movable table 34 is located in the vicinity of the final target position xp, and the movement distance is a distance equal to or less than a magnitude of an extent expressed by a unit of 100 [μm], switching of the control gains including the proportional control gains and the integral control gains is carried out.

According to this, switching to the control gains (Kp2, Kv2, Ki2) that are larger than the control gains (Kp1, Kv1, and Ki1) is carried out at a timing at which the movable table 34 is located in the vicinity of the final target position xp, and then slight movement control is carried out. According to this, the positioning settling time of the conveying apparatus 3 is shortened.

The motor control apparatus 1 prolongs the period until the outputting (delivery) of the position command value is terminated by allowing the command generation unit 11 to prolong the deceleration period in the acceleration pattern.

The motor control apparatus 1 makes a command allowing passage through the vicinity of the final target position xp in a state of "position command=final target position xp", "speed command=0", and "acceleration command=±α".

In other words, the motor control apparatus 1 excludes a control state occurring in the control method in the related art. The motor control apparatus 1 excludes a control state in "position command=final target position xp", "speed command=0", and "acceleration command=0".

Accordingly, the motor control apparatus 1 may quickly move the movable table 34 to the vicinity (magnitude of an extent expressed by a unit of 100 [μm]) of the final target position xp.

"Acceleration command=±α" represents that an acceleration command during positioning in a positive direction is set to a negative value, and an acceleration command during positioning in a negative direction is set to a positive value.

As a result, the motor control apparatus 1 switches the control gains at a timing at which the position deviation is small. The motor control apparatus 1 sets a large value for the control gains (Kp2, Kv2, and Ki2) used in the settling control unit 16. According to this, the positioning settling time is shortened.

In the first embodiment of the invention, the motor control apparatus 1 prolongs the period of outputting the position command value output by the command generation unit 11. When the position of the movable table 34 becomes close to the vicinity of the final target position xp, the motor control apparatus 1 switches to the control in which the switching control unit 14 uses the settling control unit 16. The motor control apparatus 1 prevents the position of the movable table 34 from overshooting with respect to the final target position xp.

Figure 6A:
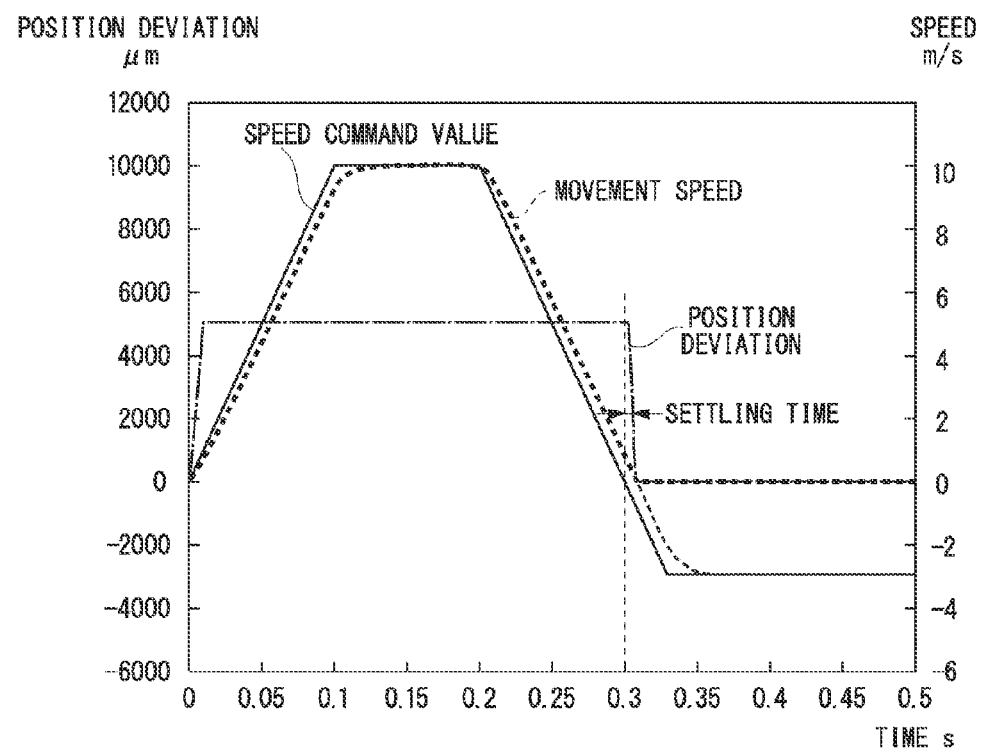
FIG. 6A is a diagram illustrating a simulation result of a control using the motor control apparatus 1 according to the first embodiment of the invention.
Figure 6B:
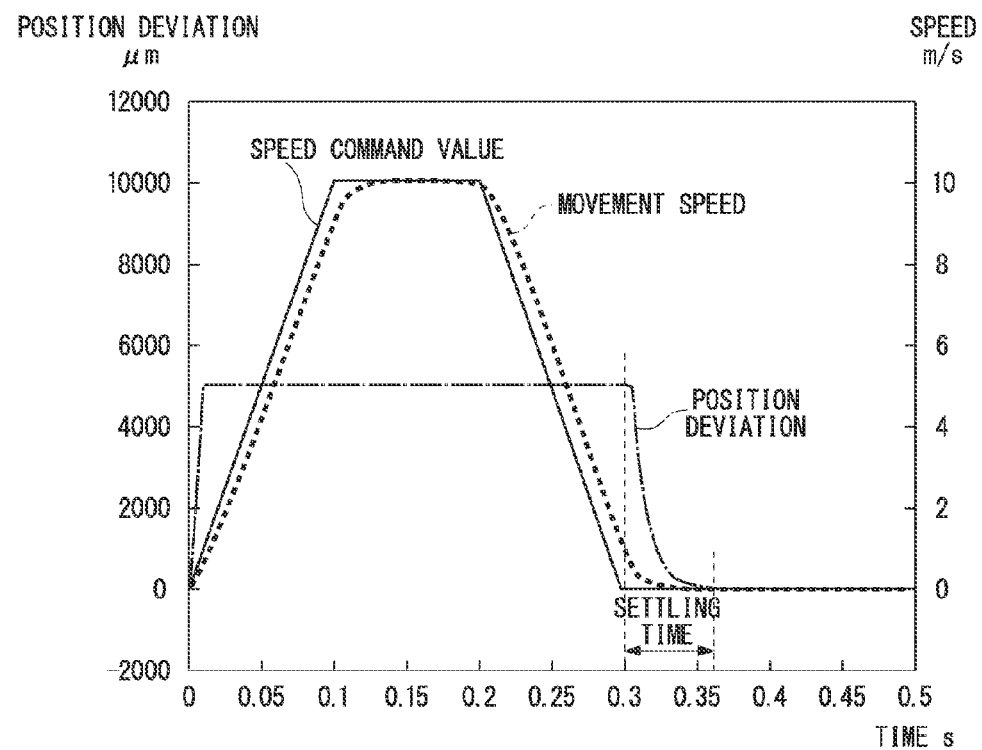
FIG. 6B is a diagram illustrating a simulation result of a case in which change of an acceleration pattern and switching of a current command value are not carried out.

FIG. 6A shows a diagram illustrating a simulation result of the control using the motor control apparatus 1 according to the first embodiment of the invention. FIG. 6B is a diagram illustrating a simulation result of a case (example in the related art) in which change of the acceleration pattern and switching of the current command value are not carried out.

In FIGS. 6A and 6B, the horizontal axis represents time, and the vertical axis represents position deviation and speed.

In FIG. 6A, a thin broken line after a time 0.3 [s] represents a speed command value corresponding to the acceleration pattern changed by the acceleration command generation unit 111.

As shown in FIG. 6A, in the motor control apparatus 1, since the command generation unit 11 has prolonged the period until the outputting (delivery) of the position command value is terminated, the movement speed after the time 0.3 [s] does not gradually vary to "0". In the motor control apparatus 1, the movement speed after the time 0.3 [s] varies to "0" with the same inclination as that before the time 0.3 [s].

As shown in FIG. 6B, in the example of the related art, the outputting of the position command value is terminated at the time 0.3 [s], and a control using a position deviation of "speed command value=0" and "acceleration command value=0" is carried out. In the example of the related art, since the control uses the position deviation with which a response becomes slow, a time is necessary before the movement speed and the position deviation become "0". In the example of the related art, the movement speed and the position deviation gradually vary to "0".

In this manner, in the motor control apparatus 1, since a outputting period of the position command value is prolonged, the control using the position deviation and the speed deviation is continuously carried out even after the time 0.3 [s]. According to this, in the motor control apparatus 1, the time (settling time) until the movement speed and the position deviation become "0" is shortened compared to the example in the related art.

Second Embodiment

A motor control apparatus 4 according to the second embodiment related to the invention will be described.

The motor control apparatus 4 according to the second embodiment is provided with a command generation unit 11A in place of the command generation unit 11 of the motor control apparatus 1 according to the first embodiment. The command generation unit 11A has a configuration different from that of the command generation unit 11.

Hereinafter, the command generation unit 11A will be described. The same reference numerals are given to the same configurations, and description thereof will be omitted.

Figure 7:
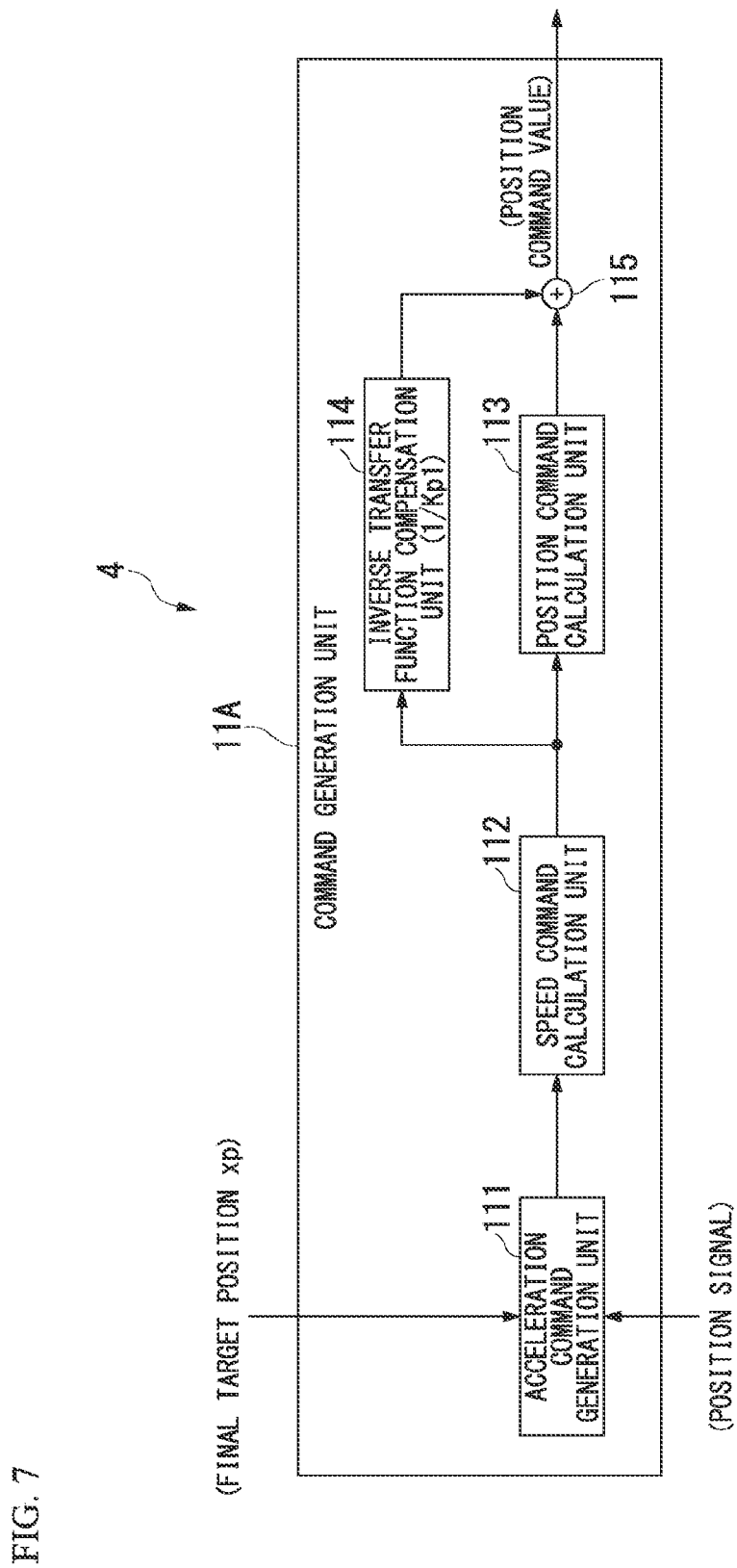
FIG. 7 is a schematic block diagram illustrating a configuration of a command generation unit 11A provided to a motor control apparatus 4 according to a second embodiment of the invention.

FIG. 7 shows a schematic block diagram illustrating a configuration of the command generation unit 11A provided to the motor control apparatus 4 according to the second embodiment of the invention.

The command generation unit 11A includes an acceleration command generation unit 111, a speed command calculation unit 112, a position command calculation unit 113, an inverse transfer function compensation unit 114, and an adder 115.

The command generation unit 11A is different from the command generation unit 11 in that the inverse transfer function compensation unit 114 and the adder 115 are provided.

The inverse transfer function compensation unit 114 multiplies the speed command value calculated by the speed command calculation unit 112 by the reciprocal of the proportional control gain Kp1 used in the movement control unit 15 of the control unit 12 to calculate a correction value with respect to the position command value, and outputs the calculated correction value.

The adder 115 adds the position command value calculated by the position command calculation unit 113 and the correction value calculated by the inverse transfer function compensation unit 114. The adder 115 outputs the addition result (position command value) to the control unit 12.

In the motor control apparatus 4 according to the second embodiment, the correction value corresponding to the position deviation that occurs with respect to the position command value is calculated using the correction value calculated by the inverse transfer function compensation unit 114, and the position command value is corrected.

According to this, the motor control apparatus 4 prevents the delay with respect to the position command value. The motor control apparatus 4 reduces a response delay in the conveying apparatus 3. In the motor control apparatus 4, the positioning settling time is further shortened.

Figure 8A:
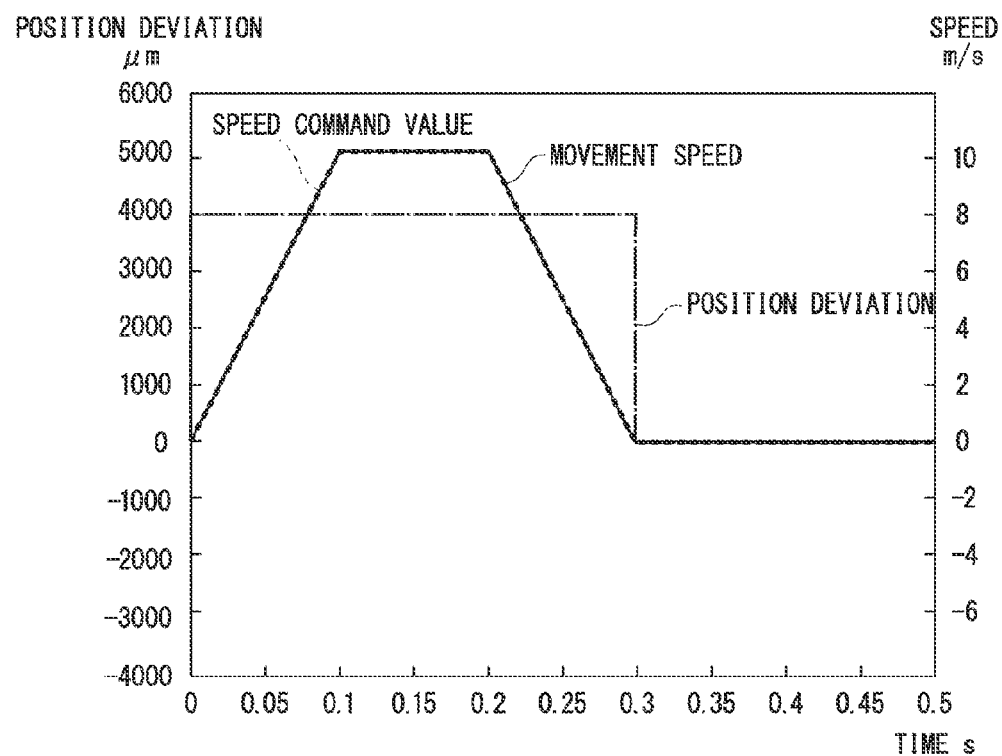
FIG. 8A is a first diagram illustrating a simulation result of a control using the motor control apparatus 4 according to the second embodiment of the invention.
Figure 8B:
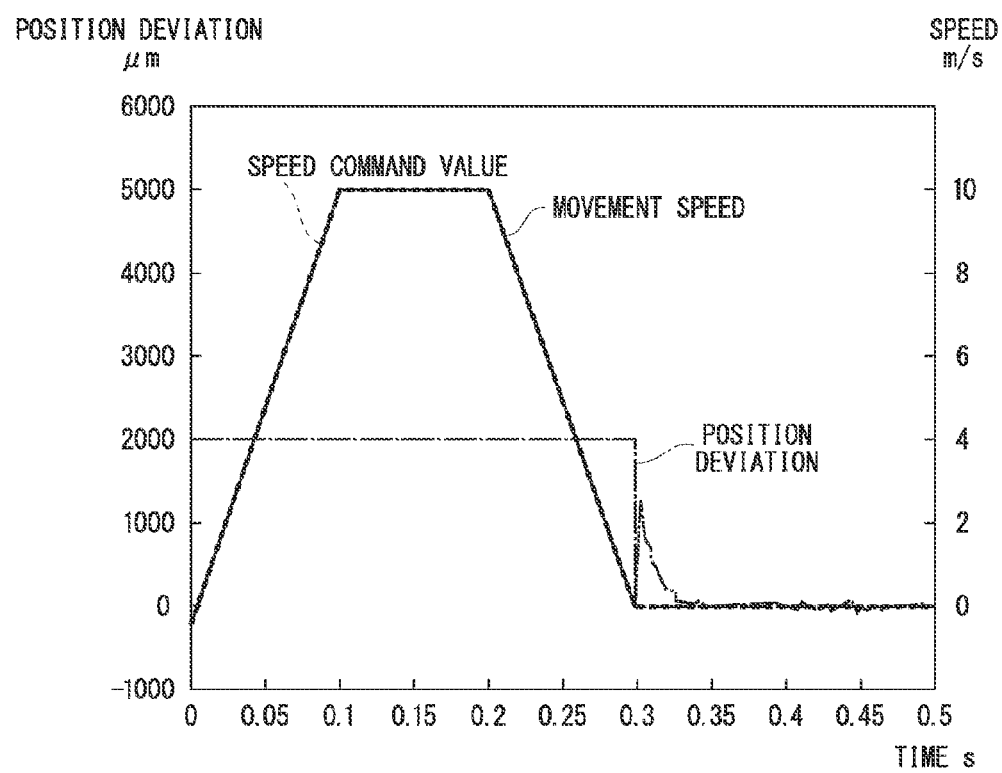
FIG. 8B is a first diagram illustrating a simulation result of a case (example in the related art) in which the change of the acceleration pattern and the switching of the current command value are not carried out.

FIG. 8A shows a first diagram illustrating a simulation result of a control using the motor control apparatus 4 according to the second embodiment of the invention. FIG. 8B is a first diagram illustrating a simulation result of a case (example in the related art) in which the change of the acceleration pattern and the switching of the current command value are not carried out.

In FIGS. 8A and 8B, the horizontal axis represents time, and the vertical axis represents position deviation and speed.

As shown in FIG. 8A, in the motor control apparatus 4, since the command generation unit 11A corrects the position command value using the proportional control gain Kp1, the movement speed responds to the speed command value without delay.

As shown in FIG. 8B, in the example in the related art, the movement speed responds to the speed command value without delay. However, the position deviation temporarily becomes "0" at a time 0.3 [s] at which the outputting of the position command value is terminated, but a late response occurs after the time.

In this manner, in the motor control apparatus 4, the positioning settling time is shortened compared to the related art.

Figure 9A:
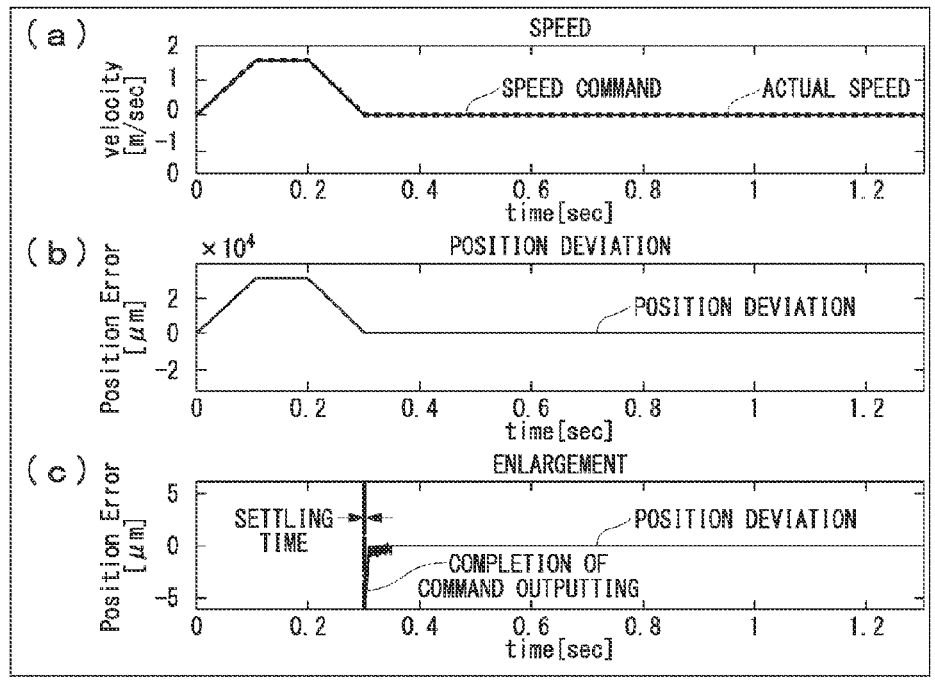
FIG. 9A is a second diagram illustrating the simulation result of the control using the motor control apparatus 4 according to the second embodiment of the invention.

FIG. 9A shows a second diagram illustrating the simulation result of the control using the motor control apparatus 4 according to the second embodiment of the invention. (a) illustrates a speed command and an actual speed of the movable table 34. (b) illustrates a position deviation. (c) is an enlarged diagram of (b).

Figure 9B:
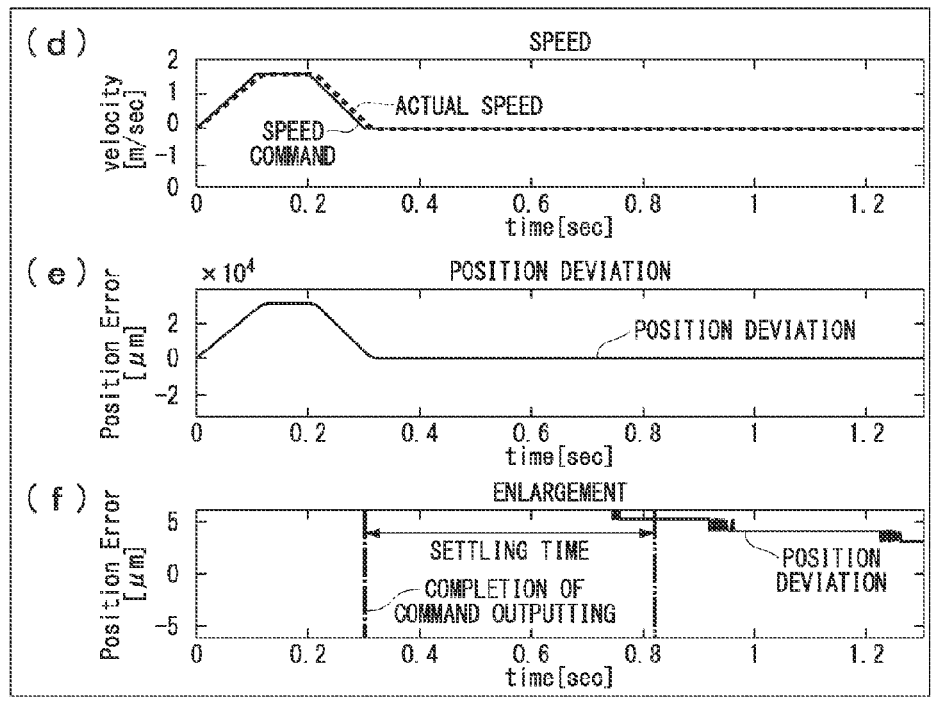
FIG. 9B is a second diagram illustrating a simulation result of a case (example in the related art) in which the change of the acceleration pattern and the switching of a control gain are not carried out.

FIG. 9B shows a second diagram illustrating a simulation result of a case (example in the related art) in which the change of the acceleration pattern and the switching of the control gain are not carried out. (d) illustrates a speed command and an actual speed of the movable table 34. (e) illustrates a position deviation. (f) is an enlarged diagram of (e).

In FIG. 9A, a simulation under the following conditions is carried out.

Mass of the movable table 34: 10 [kg]

Drive stroke (movement distance) of the movable table 34: 300 [mm]

Drive acceleration of the linear motor 31: 1.5 [G]

Maximum drive speed: 1.5 [m/s]

Threshold value $\Delta x$ in the position deviation determination unit 141: 10 [μm]

Proportional control gain Kp1 in the movement control unit 15: 60

Proportional control gain Kv1 in the movement control unit 15: 300

Integral control gain Ki1 in the movement control unit 15: 27,000

Proportional control gain Kp2 in the settling control unit 16: 500

Proportional control gain Kv2 in the settling control unit 16: 1,600

Integral control gain Ki2 in the settling control unit 16: 768,000

As shown in (a) of FIG. 9A, in the motor control apparatus 4, the actual speed (movement speed) of the movable table 34 responds to a speed command without delay.

As shown in (c) of FIG. 9A, the position deviation converges and settles in a short time after the time 0.3 [s].

In the motor control apparatus 4, when outputting (delivery) of the command is completed at the time 0.3 [s], the position deviation settles after 3.7 [ms]. In the motor control apparatus 4, in a case where an error of ±5 [μm] is allowed with respect to a drive stroke of 300 [mm], the positioning settling time is 3.7 [ms].

On the other hand, as shown in (f) of FIG. 9B, in a motor control apparatus of the related art, the positioning settling time is 521.4 [ms].

Figure 10A:
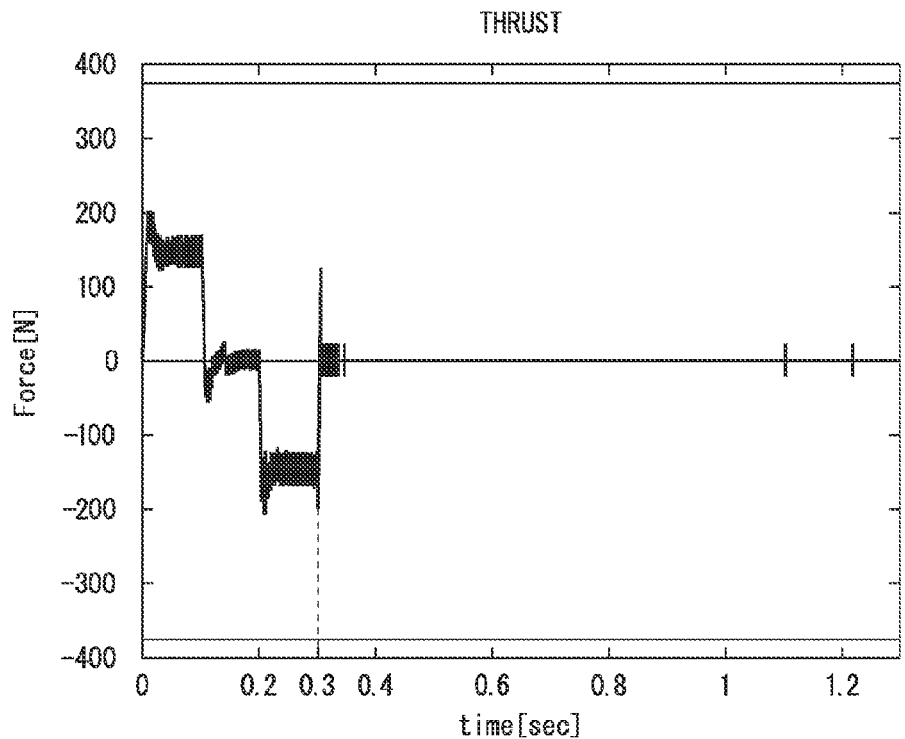
FIG. 10A is a third diagram illustrating the simulation result of the control using the motor control apparatus 4 according to the second embodiment of the invention.

FIG. 10A shows a third diagram illustrating the simulation result of the control using the motor control apparatus 4 according to the second embodiment of the invention.

Figure 10B:
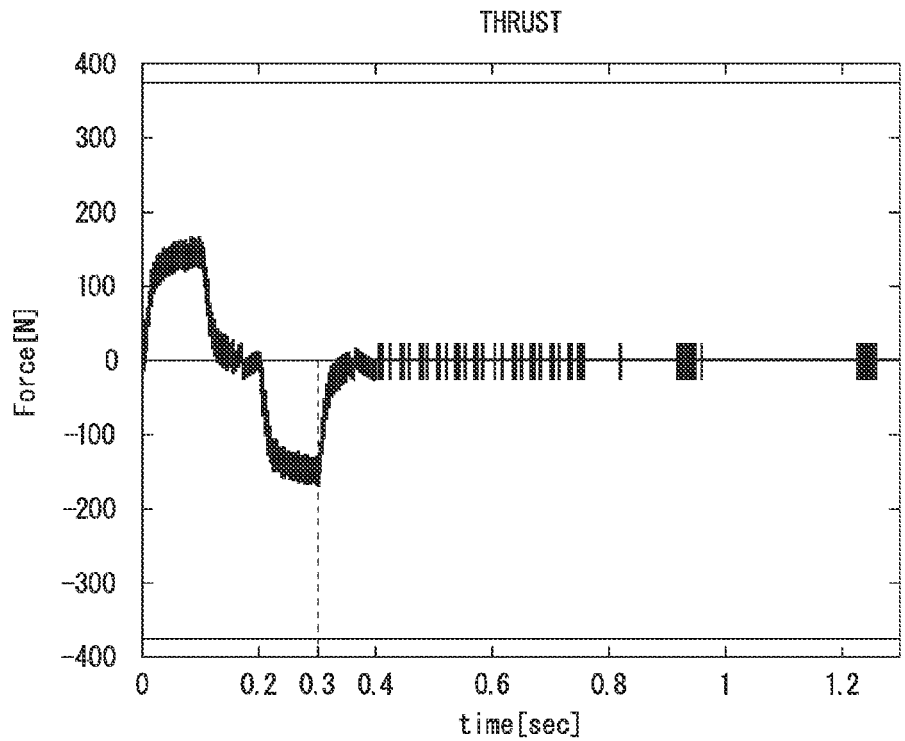
FIG. 10B is a third diagram illustrating a simulation result in a case in which the change of the acceleration pattern and the switching of the control gain are not carried out.

FIG. 10B shows a third diagram illustrating a simulation result in a case in which the change of the acceleration pattern and the switching of the control gain are not carried out.

In FIGS. 10A and 10B, the horizontal axis represents a time, and the vertical axis represents a thrust of the linear motor 31. Conditions in the simulation of FIG. 10 are the same as the case of the simulation of FIG. 9A.

As shown in FIG. 10A, in the motor control apparatus 4, settling is carried out in a short time after a deceleration period of from a time 0.2 [s] to a time 0.3 [s].

As shown in FIG. 10B, in an example of the related art, a time is necessary after the deceleration period before stopping.

In the motor control apparatus 4, the positioning settling time, which is necessary before the movable table 34 is stopped at the final target position xp after the outputting of the command is terminated, is shortened.

As shown in results of the simulation, the motor control apparatus 4 may significantly shorten the settling time in the movement control of the conveying apparatus 3.

Third Embodiment

A motor control apparatus 5 according to a third embodiment related to the invention will be described.

Figure 11:
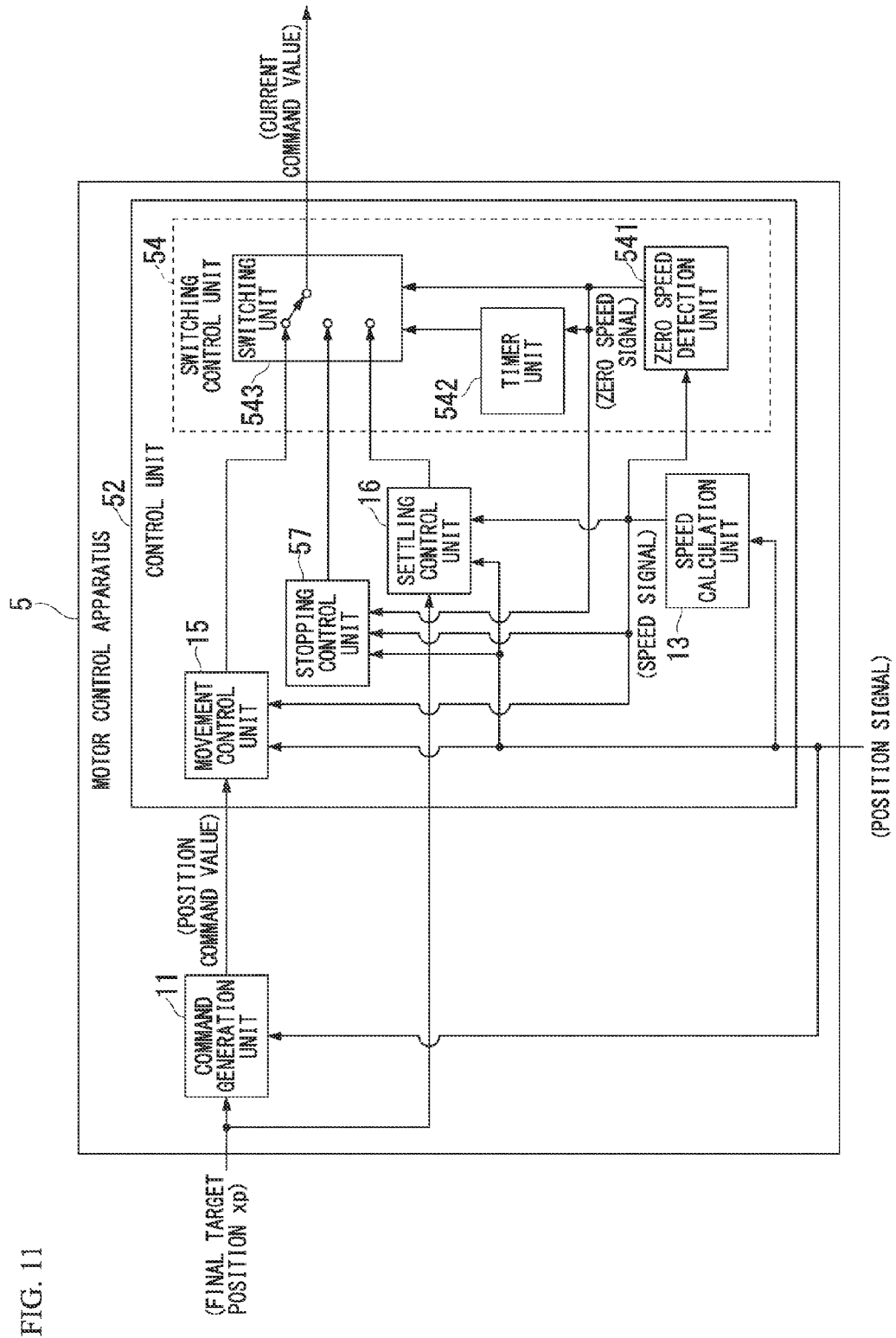
FIG. 11 is a schematic block diagram illustrating a configuration of a motor control apparatus 5 according to a third embodiment of the invention.

FIG. 11 shows a schematic block diagram illustrating a configuration of the motor control apparatus 5 according to the third embodiment.

The motor control apparatus 5 is provided with a command generation unit 11, and a control unit 52.

The control unit 52 includes a speed calculation unit 13, a switching control unit 54, a movement control unit 15, a settling control unit 16, and a stopping control unit 57.

In the motor control apparatus 5, the control unit 52 includes the switching control unit 54 and the stopping control unit 57, and thus the control unit 52 is different from the control unit 12 of the motor control apparatus 1 according to the first embodiment.

Hereinafter, the switching control unit 54 and the stopping control unit 57 will be described. The same reference numerals are given to the same configurations, and description thereof will be omitted.

The switching control unit 54 includes a zero speed detection unit 541, a timer unit 542, and a switching unit 543.

The zero speed detection unit 541 carries out a control of allowing the switching unit 543 to select the movement control unit 15 in an acceleration period. The zero speed detection unit 541 determines whether or not the movement speed calculated by the speed calculation unit 13 is less than a threshold value Δv set in advance in a deceleration period. In a case where the movement speed is less than the threshold value Δv, the zero speed detection unit 541 carries out a control of allowing the switching unit 543 to switch a selection from the movement control unit 15 to the stopping control unit 57.

When the movement speed v of the movable table 34 decelerates to the vicinity of "0" after starting to decelerate the movable table 34, the zero speed detection unit 541 carries out switching by the switching unit 543.

A case where the movement speed v is in the vicinity of "0" represents a case satisfying "|v|<Δv".

The threshold value Δv is a value set in advance on the basis of resolution of the position detector 35, a settling time that is required, or the like. The threshold value Δx is set on the basis of simulation or a measured value.

When a time T set in advance elapses after the zero speed detection unit 541 is switched to the control by the stopping control unit 57, the timer unit 542 operates. The timer unit 542 carries out a control of allowing the switching unit 543 to switch the selection from the stopping control unit 57 to the settling control unit 16. As the time T, a time calculated as the reciprocal of the proportional control gain Kp1 is set.

The switching unit 543 selects any one among the current command value output from the movement control unit 15, the current command value output from the stopping control unit 57, and the current command value output from the settling control unit 16 on the basis of the control of the zero speed detection unit 541 and the timer unit 542. The switching unit 543 outputs the selected current command value to the power amplifier 2.

The stopping control unit 57 outputs the current command value on the basis of a zero speed signal, a position signal, and a speed signal. The zero speed signal is a signal output by the zero speed detection unit 541 when satisfaction of "|v|<Δv" is detected.

Figure 12:
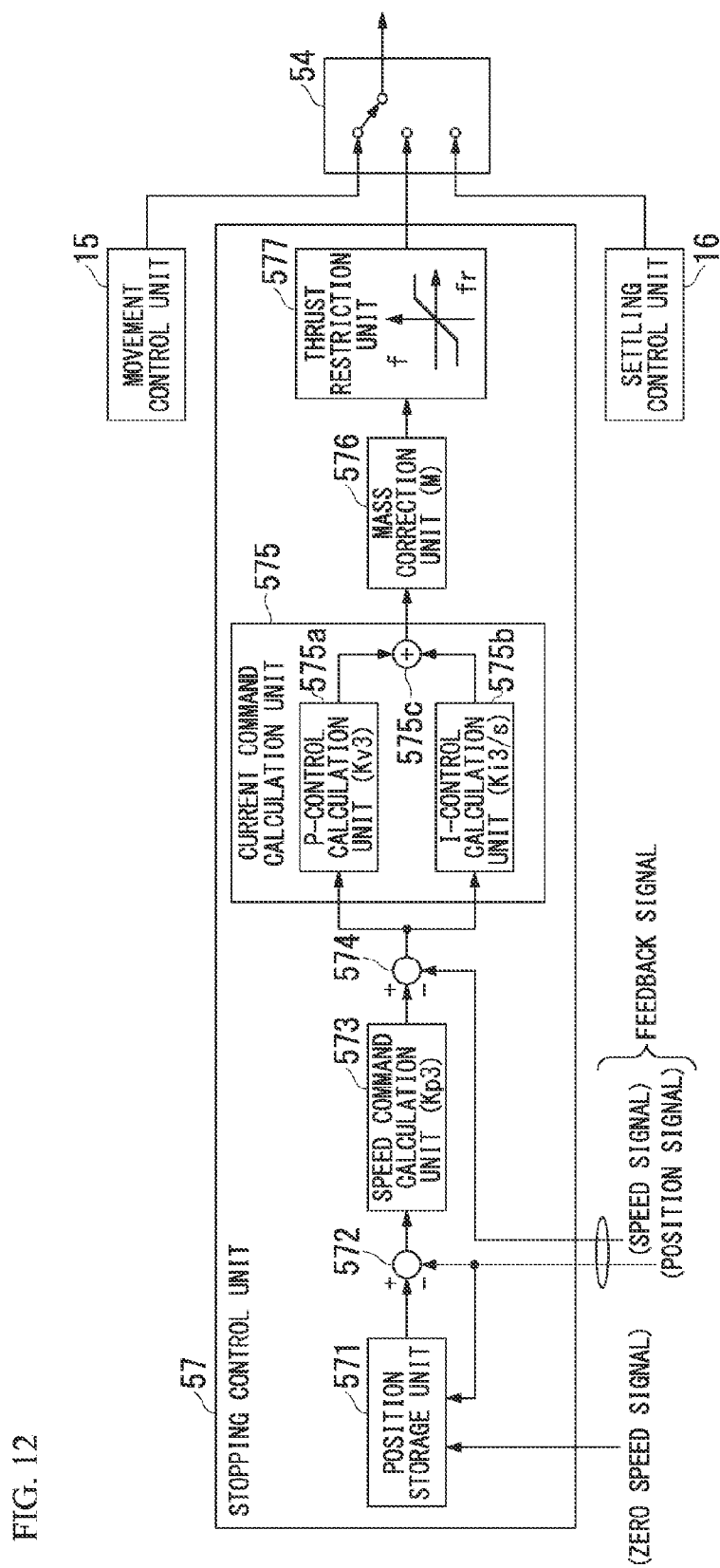
FIG. 12 is a schematic block diagram illustrating a configuration of a stopping control unit 57 according to the third embodiment of the invention.

FIG. 12 shows a schematic block diagram illustrating a configuration of the stopping control unit 57 according to the third embodiment of the invention.

The stopping control unit 57 includes a position storage unit 571, a position deviation calculation unit 572, a speed command calculation unit 573, a speed deviation calculation unit 574, a current command calculation unit 575, a mass correction unit 576, and a thrust restriction unit 577.

The position signal and the zero speed signal are input to the position storage unit 571.

The position storage unit 571 stores the position of the movable table 34 when "|v|<Δv" is satisfied. The position storage unit 571 outputs the stored position.

The position deviation calculation unit 572 calculates a position deviation between the position stored in the position storage unit 571 and the position of the movable table 34 which is indicated by the position signal.

The speed command calculation unit 573 multiplies the position deviation calculated by the position deviation calculation unit 572 by a proportional control gain Kp3 (third proportional control gain) to calculate a speed command value.

The speed deviation calculation unit 574 calculates a speed deviation between the speed command value calculated by the speed command calculation unit 573 and the movement speed of the movable table 34 which is indicated by the speed signal.

The current command calculation unit 575 includes a P-control calculation unit 575a, an I-control calculation unit 575b, and an adder 575c.

The P-control calculation unit 575a calculates a current command value by proportional operation using the speed deviation calculated by the speed deviation calculation unit 574 and a proportional control gain Kv3.

The I-control calculation unit 575b calculates a current command value by integration operation using the speed deviation calculated by the speed deviation calculation unit 574 and an integral control gain Ki3.

The adder 575c adds the current command values calculated by the P-control calculation unit 575a and the I-control calculation unit 575b, respectively. The adder 575c outputs the summed current command value to the mass correction unit 576.

In this manner, the current command calculation unit 575 calculates the current command value from the speed deviation by the PI-control operation using the proportional control gain Kv3 and the integral control gain Ki3. The current command calculation unit 575 outputs the calculated current command value to the mass correction unit 576.

The mass correction unit 576 corrects the current command value output from the current command calculation unit 575 on the basis of the mass of the movable table 34, or the mass of the movable table 34 and the mass of a baggage and the like loaded on the movable table 34.

The thrust restriction unit 577 determines whether or not the current command value corrected by the mass correction unit 576 exceeds the maximum current value corresponding to the maximum thrust of the linear motor 31. In a case where it is determined that the current command value exceeds the maximum current value, the thrust restriction unit 577 restricts the current command value to the maximum current value and outputs the restricted current command value to the switching control unit 54.

The proportional control gain Kp3 used in the stopping control unit 57 is set in advance to a value larger than the proportional control gain Kp1 used in the movement control unit 15.

The proportional control gain Kv3 used in the stopping control unit 57 is set in advance to a value equal to or larger than the value of the proportional control gain Kv1 used in the movement control unit 15.

The integral control gain Ki3 is set in advance to a value equal to or larger than the value of the integral control gain Ki1 used in the movement control unit 15.

The proportional control gains Kp3 and Kv3 used in the stopping control unit 57 may be set to values equal to or larger than the values of the proportional control gains Kp2 and Kv2 that are used in the settling control unit 16.

The values of the proportional control gains Kp3 and Kv3, and the value of the integral control gain Ki3 are determined on the basis of simulation results, or a measurement obtained using a real machine, and the like.

According to the above-described configuration, when the final target position xp is input from the upper-level control apparatus, the motor control apparatus 5 allows the switching control unit 54 to select the movement control unit 15. The motor control apparatus 5 outputs the current command value calculated by the movement control unit 15 to the power amplifier 2.

The motor control apparatus 5 drives the linear motor 31 to move the movable table 34. The motor control apparatus 5 reduces the movement speed of the movable table 34 on the basis of the position command value generated by the command generation unit 11.

In the motor control apparatus 5, when the movement speed becomes close to the vicinity of "0", the switching control unit 54 selects the stopping control unit 57. The motor control apparatus 5 outputs the current command value calculated by the stopping control unit 57 to the power amplifier 2 to carry out a control of stopping the movable table 34.

Then, in the motor control apparatus 5, the switching control unit 54 selects the settling control unit 16. The motor control apparatus 5 outputs the current command calculated by the settling control unit 16 to the power amplifier 2 to settle the position of the movable table 34 to the final target position xp.

In this manner, when the movable table 34 reaches the vicinity of the final target position xp, the motor control apparatus 5 carries out a control of switching the proportional control gain. According to this, the settling time is shortened.

When the movement speed becomes close to the vicinity of "0", the motor control apparatus 5 temporarily stops the movable table 34 using the stopping control unit 57. The motor control apparatus 5 stably moves the movable table 34 by the control using the settling control unit 16. According to this, the settling time is further shortened.

The switching control unit 54 carries out switching of the control gain on the basis of the movement speed. This is a case where the response of the speed control is sufficiently fast with respect to the position control in a P-Pi control using the position deviation and the speed deviation.

The case where the response of the speed control is sufficiently fast with respect to the position control represents "(speed)=(speed command value)=(position deviation)× (proportional control gain Kp)".

In the P-PI control using the position deviation and the speed deviation, "(position deviation)≅0" and "(speed≅0)" occur concurrently. The switching control unit 54 carries out switching of the control gain using the speed at which a response with respect to a position is fast at a timing at which the position deviation decreases. According to this, the settling time is further shortened.

The control unit 52 may not switch from the control using the movement control unit 15 to the control using the stopping control unit 57. Similarly to the first embodiment, in the control unit 52, the control using the movement control unit 15 may be switched to the control using the settling control unit 16.

The switching control unit 54 may carry out the switching from the control using the movement control unit 15 to the control using the stopping control unit 57 at a timing at which the position of the movable table 34 is located in the vicinity of the final target position xp. In this case, similarly to the first embodiment, the position deviation determination unit 141 may be used.

In the first to third embodiments, switching to the control gains (Kp1, Kv1, and Ki1) used in the movement control unit 15 may be carried out after settling the movable table 34 by the control using the settling control unit 16. According to this, the movable table 34 is prevented from moving due to occurrence of a position deviation by slight vibration, noise, and the like after settling of the movable table 34.

The control gains (Kp2, Kv2, and Ki2) used in the settling control unit 16 instead of the control gains (Kp1, Kv1, and Ki1) used in the movement control unit 15 may be switched to small values, respectively.

In the first to third embodiments, the description has been made with respect to a configuration in which the motor control apparatus 1 controls the linear motor 31 of the conveying apparatus 3, but there is no limitation to the configuration. A rotary motor may be controlled instead of the linear motor 31.

Figure 13:
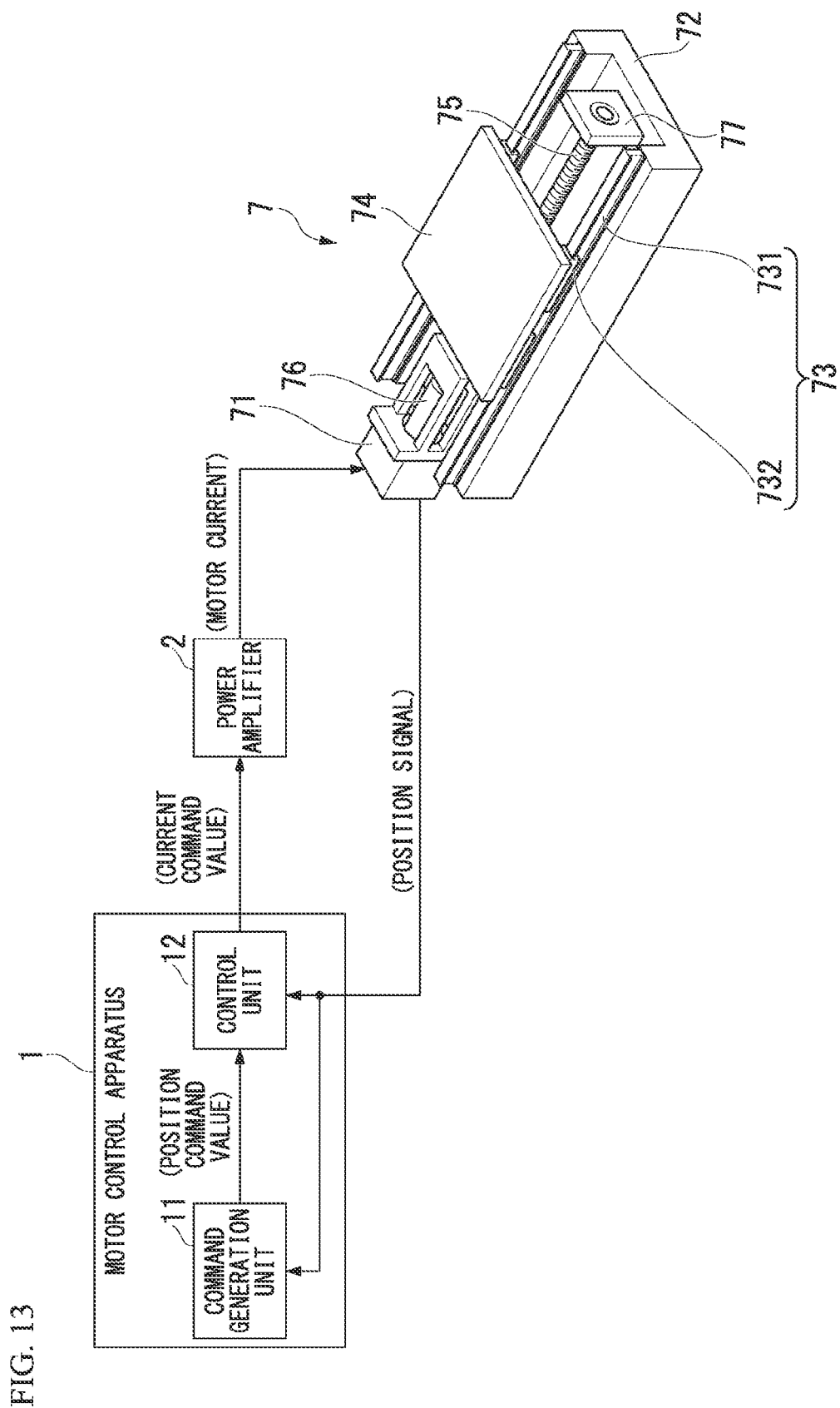
FIG. 13 is a schematic diagram illustrating the motor control apparatus 1 that controls a rotary motor of a conveying apparatus 7.

FIG. 13 shows a schematic diagram illustrating the motor control apparatus 1 that controls the rotary motor of the conveying apparatus 7.

The conveying apparatus 7 is provided with a rotary motor 71, a base 72, a guide rail 731 provided on the base 72, a rolling guide 732 mounted to the guide rail 731, and a movable table 74 provided on the roll guide 732.

The conveying apparatus 7 is provided with a coupling 76 that connects a rotary axis of the rotary motor 71 and one end of a ball screw 75, and a ball screw-receiving portion 77 that is provided on the base 72 and supports the other end of the ball screw 75.

The motor control apparatuses 4 and 5 may be used instead of the motor control apparatus 1.

The motor control apparatuses 1, 4, and 5 drive the rotary motor 71 on the basis of a position signal (a signal indicating a rotational angle of the rotary axis) output from an encoder provided to the rotary motor 71 to move the movable table 74. In the motor control apparatuses 1, 4, and 5, the settling time of the movable table 74 is shortened.

In the first to third embodiments, the description has been made with respect to a configuration in which the motor control apparatus 1 controls the linear motor 31 of the conveying apparatus 3 provided with a linear motion type guide device 33, but there is no limitation to the configuration. A motor of a device provided with a rotary type guide device may be controlled.

Figure 14:
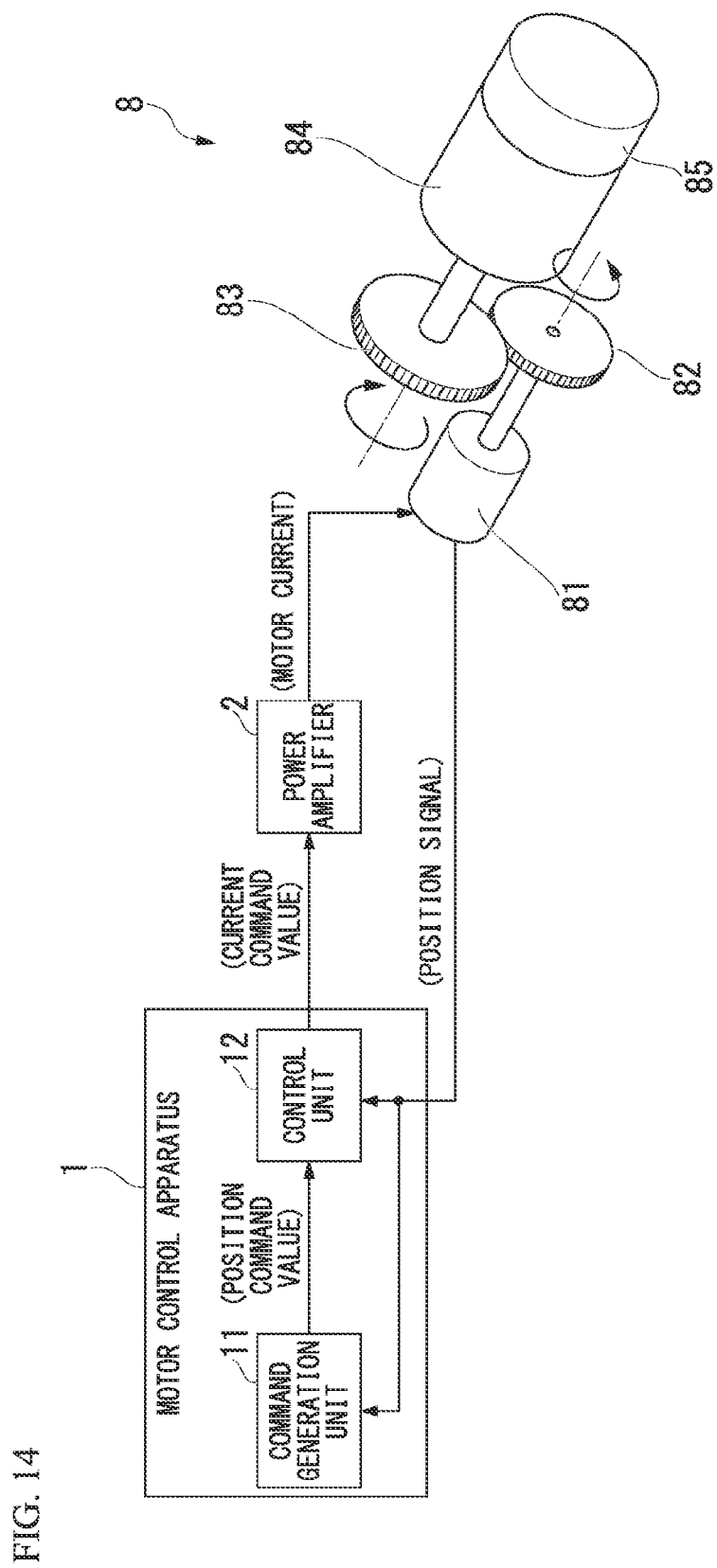
FIG. 14 is a schematic diagram illustrating the motor control apparatus 1 that controls a rotary motor of a conveying apparatus 8.

FIG. 14 is a schematic diagram illustrating the motor control apparatus 1 that controls a rotary motor of a rotary type conveying apparatus 8.

The rotary type conveying apparatus 8 is provided with a rotary motor 81, a gear 82 mounted to a rotary axis of the rotary motor 81, a gear 83 which engages with the gear 82, a rotary body 84 connected to the rotary axis of the gear 83, and a rolling guide 85 that guides rotary movement of the rotary body 84.

The motor control apparatuses 4 and 5 may be used instead of the motor control apparatus 1.

The motor control apparatuses 1, 4, and 5 drive the rotary motor 81 on the basis of the position signal (a signal indicating a rotational angle of the rotary axis) output from an encoder provided to the rotary motor 81 to rotate the rotary body 84. In the motor control apparatuses 1, 4, and 5, the settling time of the rotary body 84 is shortened.

There is no limitation to a case in which power of the rotary motor 81 is transmitted to the rotary body 84 through the gears 82 and 83. Connection may be made in such a manner that the power of the rotary motor 81 is directly transmitted to the rotary body 84.

The motor control apparatuses 1, 4, and 5 may be provided with a computer system at the inside thereof. A processing process of each of the command generation unit 11 (11A), the speed calculation unit 13, the switching control unit 14 (57), the movement control unit 15, the settling control unit 16, and the stopping control unit 57 is stored in a computer-readable recording medium in a program type. When the computer reads out and executes the program, the above-described processes are carried out.

The computer-readable recording medium represents a magnetic disk, a magneto-optical disc, a CD-ROM, a DVD-ROM, a semiconductor memory, and the like.

A computer program may be transmitted to a computer through a communication line, and the computer to which the computer program is transmitted may execute the program.

The motor control apparatuses 1, 4, and 5 may be applied to an apparatus using a servo-motor. According to this, the settling time in the apparatus using the servo-motor is shortened.

REFERENCE SIGNS LIST 1, 4, 5: Motor control apparatus
2: Power amplifier
3, 7, 8: Conveying apparatus
11, 11A: Command generation unit
12, 52: Control unit
13: Speed calculation unit
14, 54: Switching control unit
15: Movement control unit
16: Settling control unit
31: Linear motor
34: Movable table
57: Stopping control unit
71, 81: Rotary motor
111: Acceleration command generation unit
112: Speed command calculation unit
113: Position command calculation unit
114: Inverse transfer function compensation unit
115: Adder
141: Position deviation determination unit
142, 543: Switching unit
151, 161, 572: Position deviation calculation unit
152, 162, 573: Speed command calculation unit
153, 163, 574: Speed deviation calculation unit
154, 164, 575: Current command calculation unit
154a, 164a, 575a: P-control calculation unit
154b, 164b, 575b: I-control calculation unit
154c, 164c, 575c: Adder
155, 165, 576: Mass correction unit
166, 577: Thrust restriction unit
541: Zero speed detection unit
542: Timer unit
571: Position storage unit

The invention claimed is:

1. A motor control apparatus, comprising:
a computer system having one or more processors;
a processor based command generation unit that generates an acceleration pattern time-sequentially indicating an acceleration command value to be used during movement of a target object to a target position using a motor, makes a change to the generated acceleration pattern to prolong a period of reducing a driving speed of the motor in accordance with response characteristics of the motor, and outputs a position command value from the changed acceleration pattern; and
a processor based control unit that drives the motor using a proportional control with respect to a position deviation between the position command value output from the command generation unit and the target position of the target object, and changes a proportional control gain in the proportional control to a value larger than a current value when the target object reaches the vicinity of the target position, wherein:
the command generation unit makes a change to the generated acceleration pattern to prolong the period of reducing the driving speed of the motor by a time longer than a response delay of the motor and has a region in which a speed calculated in the command generation unit becomes a negative value, and
the control unit includes,
a processor based position detection unit that detects a position of the target object, and
a processor based switching control unit that drives the motor when a difference between the position detected by the position detection unit and the target position is smaller than a threshold value set in advance.

2. The motor control apparatus according to claim 1, wherein the control unit includes,
a processor based movement control unit that calculates a first current command value with respect to the motor using a difference between the position command value calculated by the command generation unit and the position of the target object, and a first proportional control gain, and drives the motor, a processor based settling control unit that calculates a second current command value with respect to the motor using a difference between the target position and the position of the target object, and a second proportional control gain having a value larger than the first proportional control gain, and drives the motor, and the switching control unit that drives the motor using the movement control unit, and drives the motor using the settling control unit.

3. The motor control apparatus according to claim 2, wherein the movement control unit includes, a processor based first position deviation calculation unit that calculates a first position deviation that is a difference between the position command value generated by the command generation unit and the position of the target object, a processor based first speed command calculation unit that calculates a first speed command by multiplying the first position deviation by the first proportional control gain, a processor based first speed deviation calculation unit that calculates a first speed deviation that is a difference between the first speed command calculated by the first speed command calculation unit, and a movement speed, and a processor based first current command calculation unit that calculates a first current command using the proportional control and an integral control with respect to the first speed deviation, and wherein the settling control unit includes, a processor based second position deviation calculation unit that calculates a second position deviation that is a difference between the target position and the position of the target object, a processor based second speed command calculation unit that calculates a second speed command by multiplying the second position deviation by the second proportional control gain, a processor based second speed deviation calculation unit that calculates a second speed deviation that is a difference between the second speed command calculated by the second speed command calculation unit, and the movement speed, and a processor based second current command calculation unit that calculates a second current command using the proportional control and the integral control with respect to the second speed deviation.

4. The motor control apparatus according to claim 1, wherein the control unit includes, a processor based speed detection unit that detects a movement speed of the target object, a processor based movement control unit that calculates a first current command value with respect to the motor using a difference between the position command value calculated by the command generation unit and the position of the target object, and a first proportional control gain, and drives the motor, a processor based settling control unit that calculates a second current command value with respect to the motor using a difference between the target position and the position of the target object, and a second proportional control gain having a value larger than the first proportional control gain, and drives the motor, and the switching control unit that drives the motor using the movement control unit, and drives the motor using the settling control unit when the movement speed is lower than a threshold value set in advance in a period of reducing the movement speed.

5. The motor control apparatus according to claim 4, further comprising:

a processor based stopping control unit that calculates a current command value with respect to the motor using a difference between a position of the target object when the driving speed of the motor is lower than the threshold value, and the position of the target object, and a third proportional control gain having a value larger than the first proportional control gain, and drives the motor, wherein the switching control unit drives the motor using the stopping control unit when the movement speed is equal to or lower than a threshold value set in advance in a period of reducing the driving speed of the motor, and the switching control unit drives the motor using the settling control unit after the passage of a response time according to the first proportional control gain.

6. The motor control apparatus according to claim 5, wherein the movement control unit includes, a processor based first position deviation calculation unit that calculates a first position deviation that is a difference between the position command value generated by the command generation unit and the position of the target object, a processor based first speed command calculation unit that calculates a first speed command by multiplying the first position deviation by the first proportional control gain, a processor based first speed deviation calculation unit that calculates a first speed deviation that is a difference between the first speed command calculated by the first speed command calculation unit, and a movement speed, and a processor based first current command calculation unit that calculates a first current command using the proportional control and an integral control with respect to the first speed deviation, wherein the settling control unit includes, a processor based second position deviation calculation unit that calculates a second position deviation that is a difference between the target position and the position of the target object, a processor based second speed command calculation unit that calculates a second speed command by multiplying the second position deviation by the second proportional control gain, a processor based second speed deviation calculation unit that calculates a second speed deviation that is a difference between the second speed command calculated by the second speed command calculation unit, and the movement speed, and a processor based second current command calculation unit that calculates a second current command using the proportional control and the integral control with respect to the second speed deviation, and wherein the stopping control unit includes, a processor based third position deviation calculation unit that calculates a third position deviation that is a difference between a position of the target object when the driving speed of the motor becomes zero, and the position of the target object, a processor based third speed command calculation unit that calculates a third speed command by multiplying the third position deviation and the third proportional control gain, a processor based third speed deviation calculation unit that calculates a third speed deviation that is a difference between the third speed command calculated by the third speed command calculation unit and a movement speed, and a processor based third current command calculation unit that calculates a third current command using the proportional control and the integral control with respect to the third speed deviation.

7. A motor control method, comprising:

a command generation step of generating an acceleration pattern time-sequentially indicating an acceleration command value to be used during movement of a target object to a target position using a motor, making a change to the generated acceleration pattern to prolong a period of reducing a driving speed of the motor in accordance with response characteristics of the motor, and outputting a position command value from the changed acceleration pattern; and a control step of driving the motor using a proportional control with respect to a position deviation between the position command value output from the command generation step and the target position of the target object, and changing a proportional control gain in the proportional control to a value larger than a current value when the target object reaches the vicinity of the target position, wherein:

the command generation step makes a change to the generated acceleration pattern to prolong the period of reducing the driving speed of the motor by a time longer than a response delay of the motor and has a region in which a speed calculated in the command generation step becomes a negative value, and the control step includes, a position detection step that detects a position of the target object, and a switching control step that drives the motor when a difference between the position detected by the position detection step and the target position is smaller than a threshold value set in advance.

8. A non-transitory computer-readable storage medium with an executable motor control program stored thereon, wherein the motor program instructs a computer to execute the following steps:

a command generation step of generating an acceleration pattern time-sequentially indicating an acceleration command value to be used during movement of a target object to a target position using a motor, making a change to the generated acceleration pattern to prolong a period of reducing a driving speed of the motor in accordance with response characteristics of the motor, and outputting a position command value from the changed acceleration pattern; and a control step of driving the motor using a proportional control with respect to a position deviation between the position command value output from the command generation step and the target position of the target object, and changing a proportional control gain in the proportional control to a value larger than a current value when the target object reaches the vicinity of the target position, wherein:

the command generation step makes a change to the generated acceleration pattern to prolong the period of reducing the driving speed of the motor by a time longer than a response delay of the motor and has a region in which a speed calculated in the command generation step becomes a negative value, and the control step includes, a position detection step that detects a position of the target object, and a switching control step that drives the motor when a difference between the position detected by the position detection step and the target position is smaller than a threshold value set in advance.

* * * * *